United States Patent
Dahle et al.

(10) Patent No.: US 12,185,873 B2
(45) Date of Patent: *Jan. 7, 2025

(54) OUTDOOR COOKING STATION WITH GRIDDLE, SYSTEM AND METHOD THEREOF

(71) Applicant: North Atlantic Imports, LLC, Logan, UT (US)

(72) Inventors: Roger Dahle, Providence, UT (US); Scott W. M. Stevenson, Smithfield, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,629

(22) Filed: Oct. 27, 2023

(65) Prior Publication Data

US 2024/0138617 A1     May 2, 2024

Related U.S. Application Data

(63) Continuation of application No. 17/702,699, filed on Mar. 23, 2022, now Pat. No. 11,800,954, which is a
(Continued)

(51) Int. Cl.
*F24C 15/14* (2006.01)
*A47J 37/06* (2006.01)
(Continued)

(52) U.S. Cl.
CPC ......... *A47J 37/0682* (2013.01); *A47J 37/067* (2013.01); *A47J 37/0704* (2013.01);
(Continued)

(58) Field of Classification Search
CPC ...... F24C 15/14; A47J 37/067; A47J 37/0682; A47J 37/0704; A47J 37/0786
See application file for complete search history.

(56) References Cited

U.S. PATENT DOCUMENTS 2,362,757 A   11/1944   Lang
2,786,929 A    3/1957   Michaelis
(Continued)

FOREIGN PATENT DOCUMENTS

BR   202016004899 U2   9/2017
CN       204379007 U   6/2015
(Continued)

OTHER PUBLICATIONS

Declaration of Inna Doliner, *North Atlantic Imports, LLC v. Nexgrill Industries, Inc.*, Case No. 5:19-CV-1195-AB-AFM, Jun. 29, 2020, 6 pages.
(Continued)

*Primary Examiner* — Kevin F Murphy
(74) *Attorney, Agent, or Firm* — David L. Stott

(57) ABSTRACT

Embodiments of a griddle of the type for an outdoor cooking station is provided herein. The griddle includes a flat cooking surface with a splash guard extending along a periphery of the flat cooking surface. The flat cooking surface defines a trough positioned adjacent a rear end of the cooking surface such that the trough includes a sloping surface extending downward toward a rear opening defined in the splash guard along and adjacent the rear end of the flat cooking surface. With this arrangement, as a user cooks food on the griddle, unwanted grease may be pushed to the rear of the griddle and into the trough so that the grease funnels down the sloped surface and through the rear opening and into a grease container centered below the rear opening.

24 Claims, 13 Drawing Sheets

Related U.S. Application Data continuation of application No. 17/214,815, filed on Mar. 27, 2021, now Pat. No. 11,284,743, which is a continuation of application No. 16/448,746, filed on Jun. 21, 2019, now Pat. No. 10,959,572, which is a continuation of application No. 16/231,384, filed on Dec. 21, 2018, now Pat. No. 10,327,589, which is a continuation-in-part of application No. 15/885,313, filed on Jan. 31, 2018, now Pat. No. 10,588,461, and a continuation-in-part of application No. 15/582,675, filed on Apr. 29, 2017, now Pat. No. 10,327,588.

(60) Provisional application No. 62/452,483, filed on Jan. 31, 2017, provisional application No. 62/331,666, filed on May 4, 2016.

(51) Int. Cl.
*A47J 37/07* (2006.01)
*B65C 3/06* (2006.01)
*B65F 1/14* (2006.01)
*A47B 37/04* (2006.01)
*F24C 15/12* (2006.01)

(52) U.S. Cl.
CPC ........... *A47J 37/0786* (2013.01); *B65C 3/065* (2013.01); *B65F 1/1415* (2013.01); *A47B 37/04* (2013.01); *A47J 2037/0795* (2013.01); *B65F 2240/142* (2013.01); *F24C 15/12* (2013.01); *F24C 15/14* (2013.01)

(56) References Cited

U.S. PATENT DOCUMENTS

| | | | |
|---|---|---|---|
| 2,817,331 | A | 12/1957 | Kaplan et al. |
| 3,046,971 | A | 7/1959 | Hogshire |
| 3,130,664 | A | 4/1964 | Jarmuth et al. |
| 3,317,709 | A | 5/1967 | Beasley |
| 3,714,885 | A | 2/1973 | Wertheimer et al. |
| 4,119,021 | A | 10/1978 | Moses |
| 4,320,699 | A | 3/1982 | Binks |
| 4,321,857 | A | 3/1982 | Best |
| 4,598,634 | A | 7/1986 | Van Horn, II |
| 4,608,917 | A | 9/1986 | Faaborg |
| 4,899,725 | A | 2/1990 | Barron, Jr. |
| 4,909,137 | A | 3/1990 | Brugnoli |
| 5,325,843 | A | 7/1994 | Bravata, Jr. |
| 5,413,032 | A | 5/1995 | Bruno et al. |
| 5,606,905 | A | 3/1997 | Boehm et al. |
| 5,678,531 | A | 10/1997 | Bryers et al. |
| 5,850,780 | A | 12/1998 | Mascia et al. |
| 5,884,555 | A | 3/1999 | Cheng |
| 5,911,812 | A | 6/1999 | Stanek et al. |
| 5,964,145 | A | 10/1999 | Brown |
| 6,205,995 | B1 | 3/2001 | Odenwald |
| 6,257,126 | B1 | 7/2001 | Veljkovic et al. |
| 6,463,924 | B1 | 10/2002 | Osterman |
| 6,644,175 | B2 | 11/2003 | Stephen et al. |
| 6,776,085 | B1 | 8/2004 | Tang |
| 6,802,308 | B1 | 10/2004 | Nugent et al. |
| 6,930,288 | B1 | 8/2005 | Lin et al. |
| 7,340,994 | B2 | 3/2008 | Bruno et al. |
| 7,514,655 | B2 | 4/2009 | Fernandez et al. |
| 7,635,827 | B2 | 12/2009 | Sie et al. |
| 7,638,738 | B1 | 12/2009 | Babington |
| 7,872,213 | B2 | 1/2011 | De Leon et al. |
| 8,137,723 | B1 | 3/2012 | Blount |
| 8,151,698 | B2 | 4/2012 | Mehta et al. |
| D694,056 | S | 11/2013 | Dahel |
| 9,192,178 | B2 | 11/2015 | Berge et al. |
| D745,802 | S | 12/2015 | Yao |
| 9,215,949 | B1 | 12/2015 | Cloutier et al. |
| 9,801,497 | B2 | 10/2017 | Feng |
| 10,327,588 | B2 | 6/2019 | Dahle et al. |
| 10,327,589 | B1 | 6/2019 | Dahle et al. |
| 10,588,461 | B2 | 3/2020 | Dahle |
| 10,952,564 | B2 | 3/2021 | Dahle et al. |
| 10,959,572 | B2 | 3/2021 | Dahle et al. |
| 11,284,743 | B2 | 3/2022 | Dahle et al. |
| 11,800,954 | B2 * | 10/2023 | Dahle ................ A47J 37/0786 |
| 2004/0216730 | A1 | 11/2004 | Sawhney et al. |
| 2006/0016348 | A1 | 1/2006 | Babington |
| 2007/0006740 | A1 | 1/2007 | Lam |
| 2012/0237647 | A1 | 9/2012 | Dobert et al. |
| 2014/0352551 | A1 | 12/2014 | Ducate et al. |
| 2015/0335200 | A1 | 11/2015 | Ortner |
| 2016/0206148 | A1 | 7/2016 | Sawhney et al. |
| 2017/0332838 | A1 | 11/2017 | Dahle et al. |
| 2017/0332839 | A1 | 11/2017 | Dahle et al. |
| 2018/0220845 | A1 | 8/2018 | Dahle |

FOREIGN PATENT DOCUMENTS

| | | |
|---|---|---|
| DE | 7014047 U | 12/1970 |
| DE | 19935983 A1 | 2/2001 |
| EP | 1071355 B1 | 4/2004 |
| GB | 2485370 A | 5/2012 |
| KR | 20110003717 U | 4/2011 |
| KR | 20120003525 U | 5/2012 |
| KR | 20140083215 A | 7/2014 |
| WO | WO2011149216 A2 | 12/2011 |

OTHER PUBLICATIONS

Cuisinart Instruction Booklet, Cuisinart Griddler Panini & Sandwich Press GR-1, 5 pages.
Cuisinart Instruction Booklet, Cuisinart Griddler GR-4, 9 pages.
Cuisinart Instruction Booklet, Cuisinart Griddler Compact GR-35, 23 pages.
Cuisinart Instruction and Recipe Booklet, Cuisinart Griddler GR-4N, 28 pages.
Cuisinart Instruction and Recipe Booklet, Cuisinart Griddler Grill & Panini Press GR-11, 20 pages.
Cuisinart Instruction Booklet, Griddler Deluxe GR-150 Series, 37 pages.
Cuisinart Griddler Series Photographs, 29 pages.
Declaration of Paul Forrest, *North Atlantic Imports, LLC v. Nexgrill Industries, Inc.*, Case No. 5:19-CV-1195-AB-AFM, Jun. 23, 2020, 4 pages.
Vulcan's Product Catalog, 85 pages.
Vulcan's Product Catalog, 87 pages.
Vulcan's MSA Series Griddles Specification Sheet, which includes the MSA48 Model, 2 pages.
Vulcan's 900RX Series Griddles Specification Sheet, which includes the 948RX Model, 2 pages.
Vulcan's 948RX/MSA48 Griddle, Jun. 16, 2014, 1 page.
Complaint for Patent Infringement, *North Atlantic Imports, LLC v. Nexgrill Industries, Inc.*, Case No. 5:19-cv-1195, Jun. 27, 2019, 102 pages.
Defendent Nexgrill Industries, Inc.'s Answer to Plaintiff's Complaint for Patent Infringement, *North Atlantic Imports, LLC v. Nexgrill Industries, Inc.*, Case No. 5:19-CV-1195-AB-AFM, Jan. 24, 2020, 8 pages.
Defendant's Initial Disclosures, *North Atlantic Imports, LLC v. Nexgrill Industries, Inc.*, Case No. 5:19-CV-1195-AB-AFM, Feb. 28, 2020, 7 pages.
Defendant Nexgrill Industries, Inc.'s Response to Plaintiff's First Set of Interrogatories, *North Atlantic Imports, LLC v. Nexgrill Industries, Inc.*, Case No. 5:19-CV-1195-AB-AFM, May 20, 2020, 20 pages.
MagiKitch'n Model MKG Gas Griddle 24", 36", 48", 60" and 72" Specification Sheet, 10/17, 2 pages.
Royal Gourmet Owner's Manual, Model GB2000, 22 pages.
Royal Gourmet Owner's Manual, Model GB5000S-Burner Gas Griddle Stainless Steel (/n/557), 2009-2017, 5 pages.
Royal Gourmet Owner's Manual, Model GD401-Premium 4-Burner Outdoor Gas Grill and Griddle, 20 pages.

(56) References Cited

OTHER PUBLICATIONS

MagiKitch'n Model MKG Gas Griddle 24", 36", 48", 60" and 72" Specification Sheet, Oct. 2013, 2 pages.
MagiKitch'n Model MKG Gas Griddle 24", 36", 48", 60" and 72" Specification Sheet, Sep. 2011, 2 pages.
MagiKitch'n Model MK Griddle Exterior Construction Specification Sheet, 2 pages.
MagiKitch'n Model MKG-36 Gas Griddle Performance Test Report, Dec. 2009, 44 pages.
Southbend Counterline—Griddle, Heavy Duty, Thermostatic, Gas Models HDG-24, HDG-36, HDG-48, HDG-60, HDG-72, HDG-36-RE, HDG-48-RE, HDG-60-RE, Specification Sheet, Mar. 2011, 2 pages.
Why Vulcan Griddles?, https://www.vulcanequipment.com/griddles, search date Feb. 12, 2020, 2 pages.

\* cited by examiner

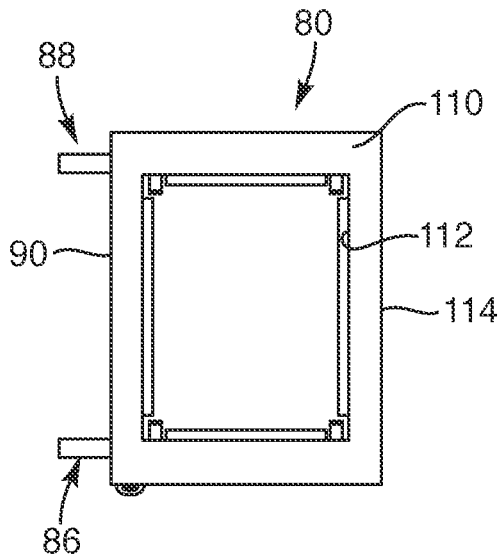
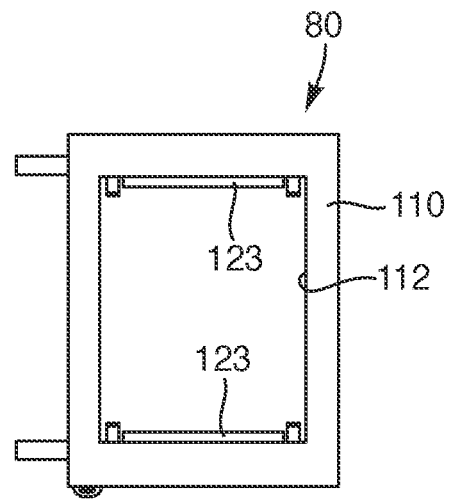
FIG. 3A  FIG. 3B
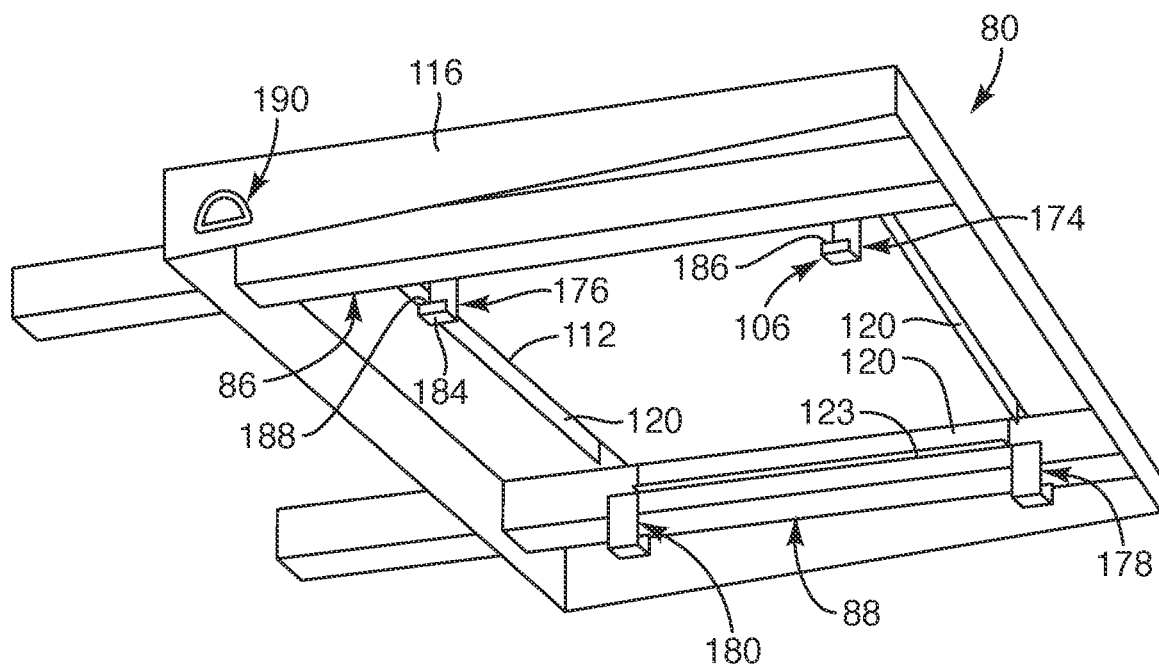
FIG. 4

OUTDOOR COOKING STATION WITH GRIDDLE, SYSTEM AND METHOD THEREOF

CROSS-REFERENCE TO RELATED APPLICATIONS

The present application is a continuation of U.S. patent application Ser. No. 17/702,699, filed Mar. 23, 2022, which is a continuation of U.S. patent application Ser. No. 17/214,815, filed Mar. 27, 2021, now U.S. Pat. No. 11,284,743, which is a continuation of U.S. patent application Ser. No. 16/448,746, filed Jun. 21, 2019, now U.S. Pat. No. 10,959,572, which is a continuation of U.S. patent application Ser. No. 16/231,384, filed Dec. 21, 2018, now U.S. Pat. No. 10,327,589, which is a continuation-in-part of U.S. patent application Ser. No. 15/885,313, filed Jan. 31, 2018, now U.S. Pat. No. 10,588,461, which claims the benefit of U.S. Provisional Application No. 62/452,483, filed Jan. 31, 2017, the disclosures of which are hereby incorporated by reference in their entirety. Further, U.S. patent application Ser. No. 16/231,384 is a continuation-in-part of U.S. patent application Ser. No. 15/582,675, filed Apr. 29, 2017, now U.S. Pat. No. 10,327,588, which claims the benefit of U.S. Provisional Application No. 62/331,666, filed May 4, 2016, the disclosures of which are hereby incorporated by reference in their entirety.

TECHNICAL FIELD

The present invention relates generally to outdoor cooking stations and, more specifically, the present invention relates to managing grease and food byproduct with the griddle of the cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

One concern with griddle cooking is the grease and byproduct build-up that inevitably occurs. Some griddles include a drain system to manage the grease either on the side or front of the griddle. Such locations keep the grease and byproduct in areas relative to the griddle and cook station that are viewable and in the region where the user is cooking, which is unsightly and still provides the potential for grease to spill, spatter, and build-up over the front side of the cooking station, often spreading to the user's clothing.

BRIEF SUMMARY OF THE INVENTION

Embodiments of the present invention are directed to various devices, systems, and methods for managing unwanted food byproduct with a portable outdoor cooking station. In one embodiment, the portable outdoor cooking station includes a frame and a griddle. The frame extends to define a front side, a rear side, a left side and a right side each extending between a lower end and an upper portion. Further, the frame includes multiple heating elements controlled along the front side and coupled to the upper portion of the frame. The griddle is configured to be supported by the upper portion of the frame and positioned above the heating elements. The griddle includes a flat cooking surface, a splash guard, and a trough. The flat cooking surface extends between a front end and a rear end and extends between left end and a right end such that each of the front end and rear end of the flat cooking surface corresponds with the respective front side and the rear side of the frame and each of the left end and right end of the flat cooking surface corresponds with the respective left side and right side of the frame. The splash guard extends upward from the flat cooking surface along each of the left and right ends and the front and rear ends of the cooking surface such that the splash guard extends upward to define an interior surface and an exterior surface of the splash guard. Further, the splash guard extends along the rear end of the cooking surface defines a rear opening therein, the rear opening extending between the interior surface and the exterior surface of the splash guard and positioned at a lower mid-portion of the splash guard adjacent the rear end of the cooking surface. The trough is defined in the cooking surface at a rear central portion of the cooking surface and adjacent the rear end of the cooking surface such that the trough includes a sloped surface extending toward the rear opening defined in the splash guard.

In another embodiment, the sloped surface of the trough defines a top edge that directly extends and depends from the cooking surface of the griddle, the top edge of the trough extending to generally exhibit a v-shape. In another embodiment, the top edge extends from a point of the v-shape to opposing first and second lower ends of the rear opening so as to define a first top edge extending from the point to the first lower end of the rear opening and to define a second top edge extending from the point to the second lower end of the rear opening. In still another embodiment, the sloped surface of the trough includes a lower valley portion, the lower valley portion of the trough sloped downward toward the rear opening and extending from the point of the v-shape directly toward the rear opening. In yet another embodiment, the trough only extends adjacent the rear end of the cooking surface such that the griddle includes no other trough extending adjacent the front end, the left end or the right end of the cooking surface.

In another embodiment, the rear opening defined in the splash guard extends with an elongated notch formed in a bottom edge of the splash guard. In still another embodiment, the splash guard includes a front splash guard, a rear splash guard, a left splash guard, and a right splash guard, the rear splash guard having a rear guard height and the front splash guard having a front guard height, the rear guard height being greater than the front guard height, the left and right splash guards having a tapering height between the rear splash guard and the front splash guard. In another embodiment, the outdoor portable cooking station further includes a grease container having a container portion, the container portion positioned directly below the rear opening of the griddle so that food byproduct funnels along the sloped surface of the trough and through the rear opening and into the container portion of the grease container.

In accordance with another embodiment of the present invention, an outdoor portable cooking station configured to manage unwanted food byproduct is provided. The outdoor portable cooking station includes a frame and a griddle. The frame includes a front side, a rear side, a left side and a right side each extending between a lower end and an upper portion. The frame includes multiple heating elements controlled along the front side and coupled to the upper portion of the frame. The griddle is configured to be supported by the upper portion of the frame and positioned above the heating elements. The griddle includes a flat cooking surface, a splash guard, and a trough. The flat cooking surface extends to define a generally rectangular configuration, extending longitudinally between a left end and a right end and extending laterally between a front end and a rear end. The splash guard extends upward from the flat cooking surface along each length of the left and right ends and the front and rear ends of the cooking surface such that the splash guard extending along the rear end of the cooking surface defines a rear opening therein. The rear opening is positioned at, and defined in, a lower mid-portion of the splash guard adjacent the rear end of the cooking surface. The trough is defined in the cooking surface at a rear central portion of the cooking surface and adjacent the rear end of the cooking surface such that the trough includes a sloped surface extending toward the rear opening defined in the splash guard.

In another embodiment, the sloped surface of the trough defines a top edge that directly extends and depends from the cooking surface of the griddle, the top edge of the trough extending to generally exhibit a v-shape. In a further embodiment, the top edge extends from a point of the v-shape to opposing first and second lower ends of the rear opening so as to define a first top edge extending from the point to the first lower end of the rear opening and to define a second top edge extending from the point to the second lower end of the rear opening. In another embodiment, the sloped surface of the trough comprises a lower valley portion, the lower valley portion of the trough sloped downward toward the rear opening and extending from the point of the v-shape directly toward the rear opening. In another embodiment, the trough only extends adjacent the rear end of the cooking surface such that the griddle includes no other trough extending adjacent the front end, the left end or the right end of the cooking surface. In another embodiment, the outdoor portable cooking station further includes a grease container having a container portion, the container portion positioned directly below the rear opening of the griddle so that food byproduct funnels along the sloped surface of the trough and through the rear opening and into the container portion of the grease container.

In accordance with another embodiment of the present invention, a griddle configured to manage unwanted food byproduct is provided. The griddle includes a flat cooking surface, a splash guard, and a trough. The flat cooking surface extends to define a generally rectangular configuration extending longitudinally between a left end and a right end and extending laterally between a front end and a rear end. The splash guard extends upward from the flat cooking surface along each length of the left and right ends and the front and rear ends of the cooking surface such that the splash guard extending along the rear end of the cooking surface defines a rear opening therein. The rear opening is positioned at, and defined in, a lower mid-portion of the splash guard adjacent the rear end of the cooking surface. The trough is defined in the cooking surface at a rear central portion of the cooking surface and adjacent the rear end of the cooking surface such that the trough includes a sloped surface extending toward the rear opening defined in the splash guard.

In another embodiment, the sloped surface of the trough defines a top edge that directly extends and depends from the cooking surface of the griddle, the top edge of the trough extending to generally exhibit a v-shape. In another embodiment, the top edge extends from a point of the v-shape to opposing first and second lower ends of the rear opening so as to define a first top edge extending from the point to the first lower end of the rear opening and to define a second top edge extending from the point to the second lower end of the rear opening. In still another embodiment, the sloped surface of the trough comprises a lower valley portion, the lower valley portion of the trough sloped downward toward the rear opening and extending from the point of the v-shape directly toward the rear opening. In yet another embodiment, the sloped surface of the trough extends downward from the first top edge to the rear opening to funnel food byproduct through the rear opening defined in the splash guard. In another embodiment, the trough only extends adjacent the rear end of the cooking surface such that the griddle includes no other trough extending adjacent the front end, the left end or the right end of the cooking surface.

In accordance with another embodiment of the present invention, a method for managing grease at a cooking station is provided. The method includes the steps of: supporting a griddle on an upper portion of a frame of an outdoor cooking station with heating elements coupled thereto, the griddle having a flat cooking surface with an upstanding splash guard extending along a periphery of the flat cooking surface such that the splash guard defines a rear opening defined therein, the rear opening positioned centrally adjacent a rear side of the cooking surface; and funneling grease from the cooking surface along a trough having a sloped surface extending downward to the rear opening defined in the splash guard such that the trough is defined in the cooking surface adjacent the rear opening along a mid-rear portion of the cooking surface.

In another embodiment, the method step of funneling includes funneling the grease from a top edge of the sloped surface defined in the flat cooking surface such that the top edge of the sloped surface extends with a v-shape, the v-shape defining a periphery of the trough. In another embodiment, the method step of funneling includes funneling the grease from the top edge, the top edge extending from a point region to a first lower end of the rear opening to define a first top edge and extending from the point region to a second lower end of the rear opening to define a second top edge, the first and second top edges defining the v-shape. In another embodiment, the method step of funneling includes funneling the grease to a single trough only extending adjacent the rear side of the cooking surface such that the griddle includes no other trough extending adjacent the front end, the left end or the right end of the cooking surface.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3A is a top view of a side shelf, according to another embodiment of the present invention;

FIG. 3B is a top view of another embodiment of a side shelf, according to the present invention;

FIG. 4 is a bottom perspective view of a side shelf, depicting hooks and ledges for the side shelf system, according to another embodiment of the present invention;

DETAILED DESCRIPTION OF THE INVENTION

Figure 1:
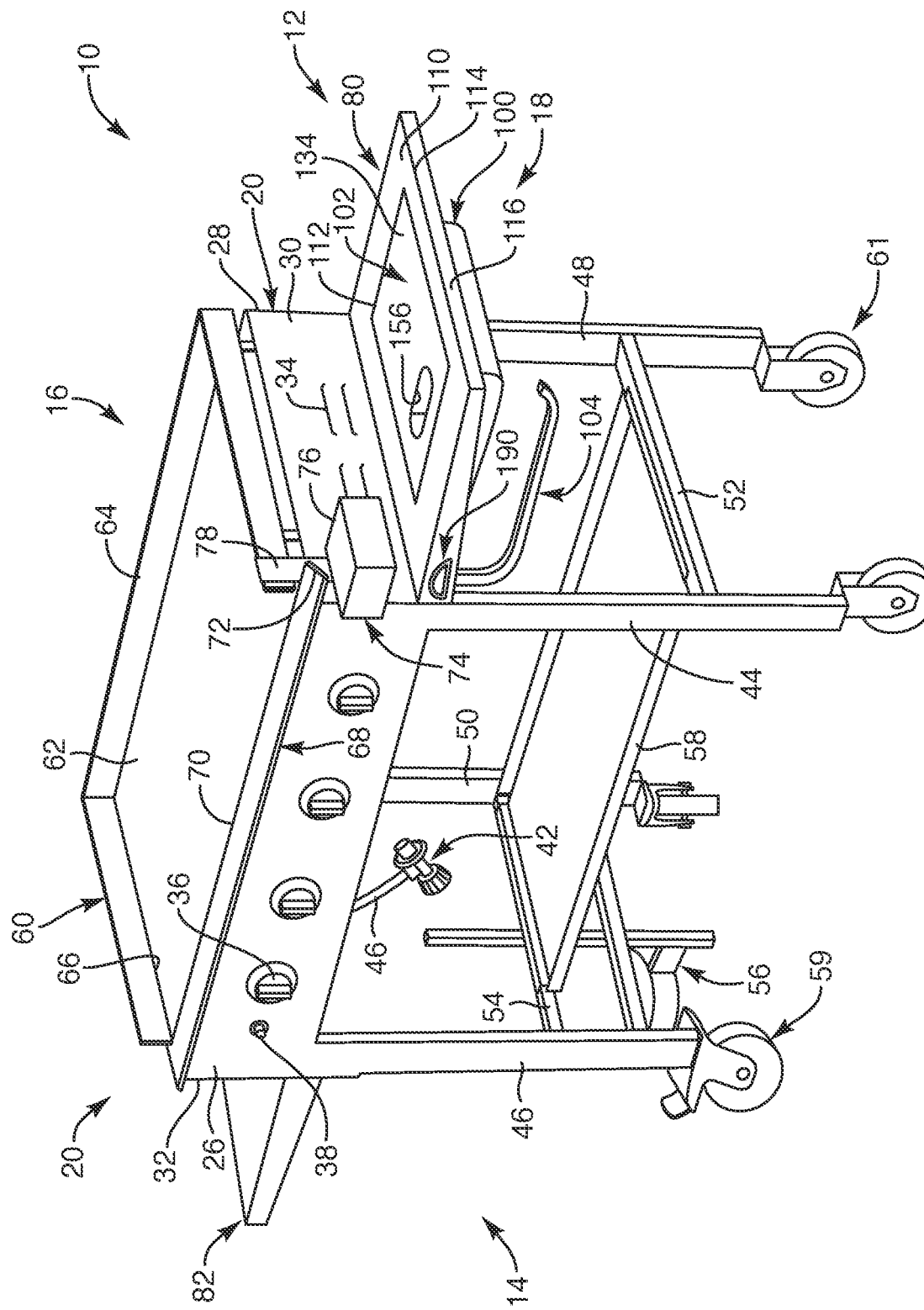
FIG. 1 is a perspective view of a portable outdoor cooking station with a side shelf system, depicting the cooking station with a griddle positioned thereon, according to one embodiment of the present invention.
Figure 2:
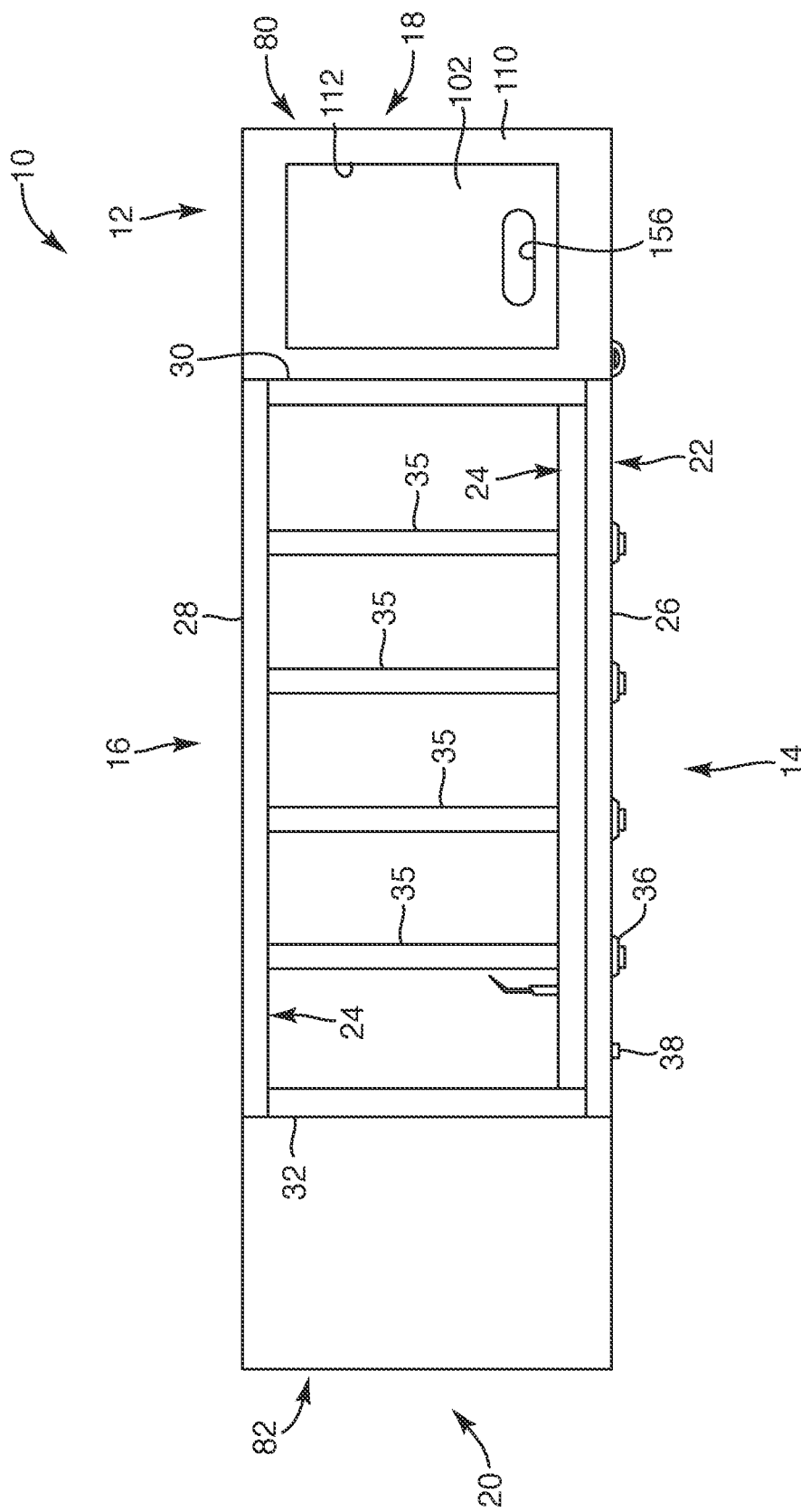
FIG. 2 is a top view of the portable outdoor cooking station, depicting the cooking station without the griddle positioned thereon, according to another embodiment of the present invention.
Figure 3:
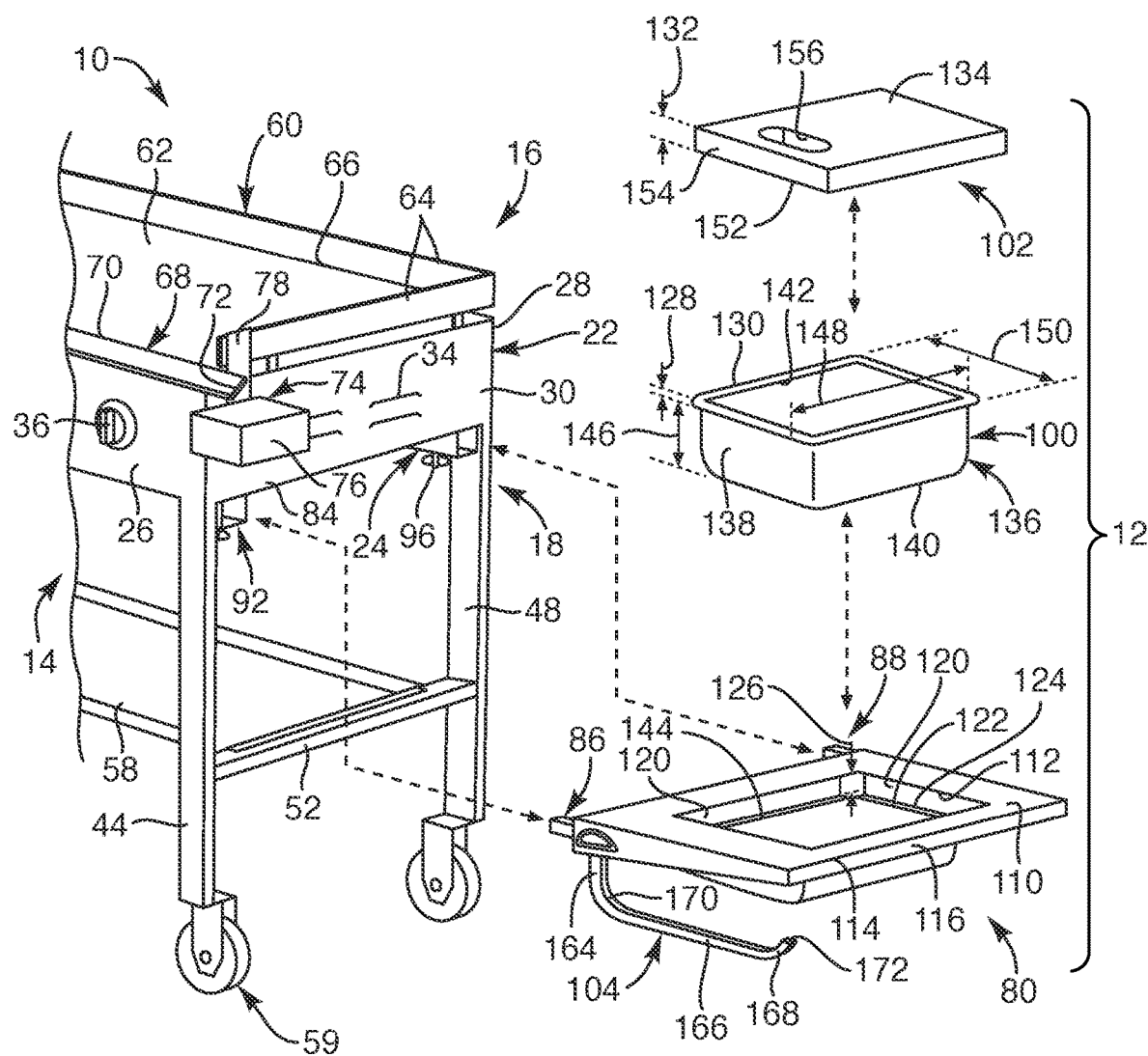
FIG. 3 is an exploded view of the portable outdoor cooking station and the side shelf system, according to another embodiment of the present invention.

Referring to FIGS. 1 through 3, a portable outdoor cooking station 10 with a side shelf system 12 is provided. Such cooking station 10 is made for outdoor use and is sized and configured to be readily moveable such that the cooking station 10 is portable. Further, the portable outdoor cooking station may be of the type that is gas heated. In one embodiment, the side shelf system 12 may be sized and configured to maintain cooked or non-cooked food while improving cleanliness of a food preparation surface. The side shelf system 12 may also be sized and configured to maintain disposable cleaning supplies. In addition, the side shelf system 12 may be sized and configured to hold waste in a readily disposable manner as well as improving cleanliness of a food preparation surface. With this arrangement, the side shelf system 12 may be employed with the cooking station 10.

The cooking station 10 may include a front side 14, a rear side 16, a first side 18, and a second side 20, the front side 14 being the side a user may stand for cooking food and operating some of the controls of the cooking station 10. The cooking station 10 may include a main body 22. The main body 22 may include a frame structure 24 to which various housing or panel structures may be attached. For example, the frame structure 24 may include panel structures, such as a front wall 26, a rear wall 28, and first and second walls 30, 32. In one embodiment, the main body 22 may not include the rear wall 28. The first and second walls 30, 32 may include vents 34 or openings therein. The front wall 26 may include various components and controls positioned and secured therewith. The main body 22 may include one or more heating elements, such as four gas burners 35, extending between the front wall 26 and the rear wall 28 or rear side 16 of the main body 22. The gas burners may receive gas by rotating burner knobs 36 from an off-position to an on-position. Such burner knobs 36 may be coupled to the front wall 26 of the main body 22 and may each be aligned with a corresponding gas burner. Each of the burner knobs 36 may include the appropriate valves and components associated therewith configured to control gas being supplied to the gas burners, as known to one of ordinary skill in the art. Further, the main body 22 may also include an igniter switch 38. The igniter switch 38 may be positioned on the front wall 26 or panel sized and configured to ignite the particular gas burners corresponding with the burner knobs 36 rotated to the on-position. The gas burners may be fueled with gas, such as propane gas, with a propane gas tank (not shown) or fueled with natural gas, which may be coupled to the gas burners via a gas line 40 and connection valve 42 or the like. Although only some of the primary components for operating the cooking station 10 are described herein, the remaining components that may be needed for proper functioning of the cooking station may be incorporated herewith and into the cooking station 10 as known by one of ordinary skill in the art.

The cooking station 10 may include four legs. The four legs may extend downward from front and rear corners or sides of the main body 22 to define first and second front legs 44, 46 and first and second rear legs 48, 50. Further, the first front and rear legs 44, 48 may include one or more first cross-members 52 extending therebetween. Similarly, the second front and rear legs 46, 50 may include one or more second cross-members 54 extending therebetween. Such one or more first and second cross-members 52, 54 may stabilize and strengthen the legs and weight of the main body 22. The one or more second cross-members 54 may include a gas tank holder 56 coupled thereto such that a gas tank (not shown) may be positioned on the gas tank holder 56 and be readily coupled to the gas line 40. Furthermore, one or more first and second cross-members 52, 54 may serve to hold and receive a lower shelf 58. Such lower shelf 58 may be employed for storing or maintaining various cooking items and/or utensils or the like or anything desired by the user. Each of the legs may include wheels, such as two caster wheels 59 and two fixed wheels 61, positioned at or adjacent to a lower end of each of the legs. For example, the second front and rear legs 46, 50 may include the caster wheels 59 and the first front and rear legs 44, 48 may include the fixed wheels 61. In another embodiment, only one of the first front and rear legs 44, 48 or second front and rear legs 46, 50 includes either the caster wheels or fixed wheels. In another embodiment, the cooking station 10 may include at least two wheels 59 coupled to a base of the frame structure 24 of the cooking station 10. In this manner, the cooking station 10 may be readily moveable to a desired location, thereby, providing portability to the cooking station 10 as well as being readily employable for outdoor use at most any desired suitable location.

In one embodiment, the cooking station 10 may be of the type that can receive a griddle 60. The griddle 60 may include a flat cooking surface 62 with upstanding walls 64 that may extend above and along at least a portion of a periphery 66 of the flat cooking surface 62. In one embodiment, the griddle 60 may include a trough 68 sized and configured to facilitate draining grease or unwanted food by-product from the flat cooking surface 62. In one embodiment, the trough 68 may extend along a front periphery 70 of the flat cooking surface 62 that may extend to an open end 72 at or adjacent to the front and first sides 14, 18 of the cooking station 10. The other end of the trough 68 may be closed or blocked so that grease may only funnel toward the open end 72. The cooking station 10 may also include a grease catcher 74. Such great catcher 70 may include a container portion 76 and a latch portion 78 that may be latched over one of the upstanding side walls 64 of the griddle 60 such that the container portion 76 of the grease catcher 74 may be positioned below the open end 72 of the trough 68. In this manner, grease or food by-product may drain into the container portion 76 of the grease catcher 74 and, later, the grease catcher 74 may be readily removed from the griddle 60 for removing any food by-product therein. In another embodiment, the cooking station 10 may include a griddle of the type disclosed in commonly assigned U.S. Non-Provisional patent application Ser. No. 15/582,675, the disclosure of which is incorporated herewith in its entirety. In another embodiment, the side shelf system 12 depicted herein may be incorporated with other types of cooking stations, such as gas heated grills, charcoal heated cooking stations, pellet heated cooking stations or any other suitable outdoor portable cooking stations.

Now with reference to FIGS. 1, 2, 3 and 3A, in another embodiment, the cooking station 10 may include a first side shelf 80 and a second side shelf 82. The first and second side shelves 80, 82 may be removably secured to the respective first and second sides 18, 20 of the cooking station 10. In another embodiment, the first and second side shelves 80, 82 may be removably secured adjacent a lower end 84 of the first and second walls 30, 32 of the main body 22 such that the first and second side shelves 80, 82 may extend from the cooking station 10 at a level lower than the cooking surface 62 of the cooking station 10 or even at a level lower than the burners 35 (FIG. 2) within the cooking station 10. For example, in one embodiment, the first side shelf 80 may include one or more frame extensions, such as a first extension 86 and a second extension 88, each of which may extend from an inner side 90 of the first side shelf 80. The first and second extensions 86, 88 may be sized and configured to be coupled to the frame structure 24 or a portion of the frame structure 24 of the main body 22. For example, the frame structure 24 may include a first sleeve 92 and a second sleeve 94 with respective ends positioned adjacent the lower end 84 of the first side wall 80. Such first and second sleeves 92, 94 may be sized and configured to receive the respective first and second extensions 86, 88. Upon inserting the first and second extensions 86, 88 into the respective first and second sleeves 92, 94, a securement device 96 may be, for example, rotated to readily tighten and secure the first side shelf 80 to the frame structure 24. Similarly, the first side shelf 80 may be readily removed from the frame structure 24 by loosening the securement device 96. In this manner, the first and second side shelves 80, 82 may be readily removed, replaced and/or upgraded.

As previously set forth, the cooking station 10 includes the side shelf system 12. The side shelf system 12 may be incorporated in one or both of the first and second side shelves 80, 82 or, as depicted, in the first side shelf 80. In one embodiment, the side shelf system 12 may include the first side shelf 80 and at least one of a food pan 100, a cutting board 102, a holder device 104, and hooks 106 (FIG. 4). The first side shelf 80 may include an upper surface 110 defining an opening 112 therein. The upper surface 110 may be a substantially flat surface and may be employed as a work surface for assisting in the preparing of food to be cooked. The opening 112 defined in the upper surface 110 may be sized and configured to receive and hold the food pan 100 and/or the cutting board 102. The upper surface 110 may extend to a periphery 114 having a rectangular shape with peripheral side walls 116 or panels extending downward from the periphery 114 of the upper surface 110 of the first side shelf 80.

With respect to FIGS. 3 and 3A, as set forth, the upper surface 110 of the first side shelf 80 defines the opening 112 therein. The structure defining such opening 112 may be rectangular in shape or a rectangular periphery. In one embodiment, each side of such rectangular periphery may include an extension 120 that may extend downward from the sides of the rectangular periphery. Further, each extension 120 may include a ledge 122 that extends inward from a lower end 124 of the extension 120 to define a depth 126. The depth 126 may define a distance or length from the ledge 122 to the upper surface 110 of the first side shelf 80. Such depth 126 may substantially correspond with a thickness 128 of a lip 130 of the food pan 100 and/or a cutting board thickness 132. In this manner, upon positioning the food pan 100 and the cutting board 102 into the opening 112, a first surface or upward facing surface 134 of the cutting board 102 may be generally or substantially flush with the upper surface 110 of the first side shelf 80.

In another embodiment, as depicted in FIGS. 3B and 4, the first side shelf 80 may include a variation of the ledges extending from extensions. In this embodiment, two of the extensions 120 extending from the opening 112 defined in the upper surface 110 of the first side shelf 80 may not include ledges, but only a downward extending extension 120. Such two extensions may extend from opposite sides of the opening 112 defined in the upper surface 110 of the first side shelf 80. Further, two of the extensions 120 may include a ledge 123. The two extensions 120 with the ledge 123 in this embodiment may extend from opposing sides of the rectangular shaped opening 112 defined in the first side shelf 80 such that each ledge 123 may extend toward each other. The extensions 120 without the ledge 123 may extend downward so as to substantially prevent lateral movement of the food pan 100 and/or the cutting board 102 (see FIG. 2) positioned on the opposing extending ledges 123.

With reference back to FIGS. 1 and 3, as previously set forth, the opening 112 defined in the first side shelf 80 may be sized and configured to receive the food pan 100. The food pan 100 may include a basin portion 136 with four upstanding side walls 138 that extend from a bottom wall 140. The upstanding side walls 138 extend upward to the before-described lip 130. The lip 130 may extend outward and/or transverse relative to the upstanding side walls such that the lip 130 may extend continuously along an upper periphery 142 of the food pan 100. In one embodiment, the lip 130 may extend outward or orthogonal relative to the upstanding side walls 138 of the food pan 100. The lip 130 may extend outward so that an underside surface of the lip 130 may be positioned on an upper surface 144 of the ledge 122 extending from the extensions 120 of the first side shelf 80 and so that the basin portion 136 of the food pan 100 may be suspended below the ledge 122.

In one embodiment, the food pan 100 may be made of a stainless steel material, or any other suitable metallic material. In another embodiment, the food pan 100 may be made of a polymeric material. In another embodiment, the food pan 100 may include a height 146 or depth of about 70 millimeters or about 2.8 inches or in the range of about 2.5 inches to 3 inches. In another embodiment, the height 146 of the food pan 100 may be in the range of about 2 inches to 6 inches. In another embodiment, the food pan 100 may include a length 148 of about 320 millimeters or about 12.6 inches or in the range of about 10 inches to 14 inches or larger. In another embodiment, the food pan 100 may include a width 150 of about 220 millimeters or about 8.6 inches or in the range of about 6 inches to 10 inches.

Further, upon the food pan 100 being positioned over the ledge 122, the cutting board 102 may be positioned within the opening 112 defined in the first side shelf 80 such that the upward facing surface 134 is substantially flush with the upper surface 110 of the first side shelf 80, as previously set forth. In one embodiment, the cutting board 102 may be made of a wood material, such as bamboo or any other suitable cutting board wood material. In another embodiment, the cutting board 102 may be made of a suitable polymeric material, such as plastic. The cutting board 102 may include substantially similar sizing as the length and width dimensions of the food pan 100. The cutting board 102 may include the upward facing surface 134 and a downward facing surface 152, both of which may be interchangeable, depending upon how the user positions the cutting board 102 into the opening 112 of the first side shelf 80. Further, the cutting board 102 may include a peripheral side 154 defining a depth or cutting board thickness 132 of the cutting board 102. As previously set forth, the depth may be sized so that the upward facing surface 134 sits flush relative to the upper surface 110 of the first side shelf 80.

The cutting board 102 may include a cutting board opening 156 defined therein. Such cutting board opening 156 may be positioned adjacent the periphery or one side of the cutting board 102 and extend completely through the cutting board 102 as a through hole. The cutting board opening 156 may be elongated and sized so that a user can readily grasp the cutting board 102 to remove or slightly lift the cutting board 102 from the opening 112 of the first side shelf 80 to access the food pan 100 or to readily remove the cutting board 102 for, for example, cleaning purposes. In this manner, a user may utilize the upward facing surface 134 of the cutting board 102 for preparing food or for any purpose desired by the user and the food pan 100 may be employed for placing cooked food or non-cooked food. Further, the cutting board opening 156 may be sized so that food or waste may be pushed or slid through the cutting board opening 156.

Figure 5:
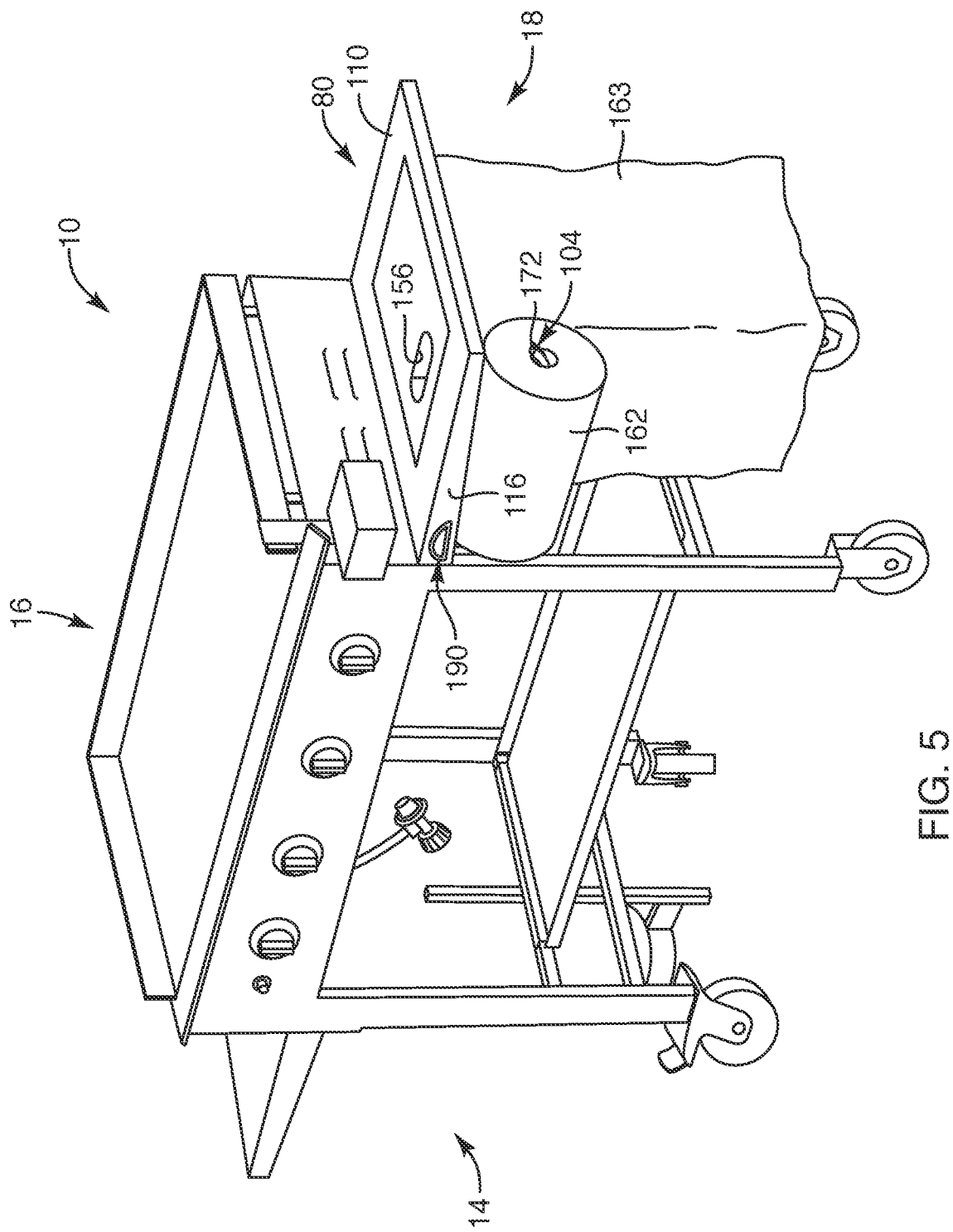
FIG. 5 is a perspective view of the portable outdoor cooking station and a side shelf system, according to another embodiment of the present invention.

With respect to FIGS. 3 and 5, as previously set forth, the first side shelf 80 may also include a holder device 104. The holder device 104 may be sized and configured to receive, for example, a single paper towel roll 162 or for hanging cloth towels or the like over a portion of the holder device 104. In one embodiment, the holder device 104 may be coupled to an underside of the first side shelf 80 and along or adjacent a front side 14 of the first side shelf 80 of the cooking station 10. The holder device 104 may be L-shaped with a first extension 164 and a second extension 166 each of which may be elongated portions and a single piece structure. The first extension 164 may include a length that is shorter than the second extension 166. The first extension 164 may include coupling structure (not shown) for coupling to the underside of the first side shelf 80 such that the first extension 164 may extend downward from the first side shelf 80. The second extension 166 may extend from an end of the first extension 164 and may extend substantially perpendicular or transverse relative to the first extension 164 such that the second extension 166 may extend substantially horizontal or parallel relative to the upper surface 110 of the first side shelf 80. The second extension 166 may include a first bend 168 adjacent to a free end 172 of the second extension 166 such that the first bend 168 extends upward. The first and second extensions 164, 166 may be a single piece structure with a second bend 170 defining the juncture between the first and second extensions 164, 166. In this manner, the holder device 104 may extend under the first side shelf 80 so that the holder device 104 does not take away space from the upper surface 110 of the first side shelf 80 while also being at a convenient location as the user is cooking or cleaning the cooking station 10 or other articles. In another embodiment, the holder device 104 may be coupled to the frame structure 24 of the cooking station 10. In another embodiment, the holder device 104 may be operatively coupled to the frame structure 24 of the cooking station 10. In another embodiment, the holder device 104 may be fixedly coupled (meaning coupled to the first side shelf 80 or the frame structure 24 of the cooking station 10) so as to extend below the first side shelf 80 in a generally horizontal manner relative to the upper surface 110 of the first side shelf 80. In another embodiment, the holder device 104 may be in the form of, for example, a cable with latches on ends of the cable to couple at two separate positions on the first side shelf such that the cable is sized to hold, for example, a paper towel roll.

With reference to FIGS. 4 and 5, in another embodiment, the cooking station 10 may include multiple hooks 106, FIG. 4 not showing the holder device 104 for simplistic purposes. The first side shelf 80 may include the multiple hooks 106, such as a first hook 174, a second hook 176, a third hook 178, and a fourth hook 180. The multiple hooks 106 may be coupled to a portion of the first and second extensions 86, 88 of the first side shelf 80. The hooks 106 may be sized and configured to be attached to, latch, or hang a garbage bag 163, such as a plastic garbage bag. The hooks 106 may be coupled, for example, adjacent to and below corners of the opening 112 defined in the upper surface 110 of the first side shelf 80 or adjacent to the ledge 122, 123. The hooks 106 may include various structures for clipping, latching, grasping or hanging an article, such as a waste or garbage bag 163. For example, the hooks 106 may be in the form of a J-hook so as to exhibit a J-shaped configuration. In one embodiment, the hooks 106 may define a downward extension 182, a base 184, and an upward extension 186, the downward extension 182 being longer than the upward extension 186. The downward extension 182 of each of the hooks 106 may be coupled to the framework or a portion of one of the first and second extensions 86, 88 of the first side shelf 80. The base 184 may extend inward from the downward extension 182 and the upward extension 186 extends upward from one end of the base 184 to a free end 188.

Each of the hooks 106 having the J-shaped configuration may be mounted to an underside of the first side shelf 80 so as to be positionably arranged to hold, for example, a waste bag directly under the cutting board 102 such that each one of the hooks 106 may face or extend outward relative to an oppositely positioned hook 106. For example, the first hook 174 may extend outward and face toward the front side and the third hook 178 may extend outward and face toward the rear side of the first side shelf 80 such that oppositely positioned hooks 106 face opposite directions. Similarly, the second hook 180 may extend outward and face toward the front side of the first side shelf 80 and the fourth hook 180 may extend outward and face toward the rear side of the first side shelf 80. In another embodiment, oppositely positioned hooks 106 having the J-shaped configuration may face or extend toward each other. Upon positioning and attaching, for example, a plastic garbage bag 163 on the hooks 106, a user may readily lift or remove the cutting board 102 and drop waste into the garbage bag 163 or the user may slide or push waste through the cutting board opening 156 to drop waste into the garbage bag 163. In this embodiment, the user may not position the food pan 100 onto the ledges 123 of the first side shelf 80.

With reference to FIGS. 1, 4, and 5, in another embodiment, the user may include the food pan 100 onto the ledges 122, 123 (see FIG. 3) with the cutting board 102 positioned over the food pan 100, and utilize only two of the hooks 106 of the first side shelf 80. For example, with the food pan 100 and cutting board 102 positioned within the first side shelf 80, the user may utilize the first hook 174 and the second hook 176 to hang a garbage bag so that the bag may be easily accessible along the front side 14 of the cooking station 10. Similarly, the user may also effectively utilize the first hook 174 and the third hook 178 so that the bag may be accessible along the first side 18 of the cooking station 10. In this manner, the hooks 106 may be utilized while also maintaining the benefits of the food pan 100 and the cutting board 102 of the side shelf system 12.

In another embodiment, the side shelf system 12 may include a bottle opener device 190. The bottle opener device 190 may be coupled to the first side shelf 80. In one embodiment, the bottle opener device 190 may be fixed to the peripheral side wall 116, such as a front peripheral side wall, of the first side shelf 80. In another embodiment, the bottle opener device 190 may be operatively coupled to the first side shelf 80 so as to be coupled to a line that may hang from the first side shelf 80.

Figure 6:
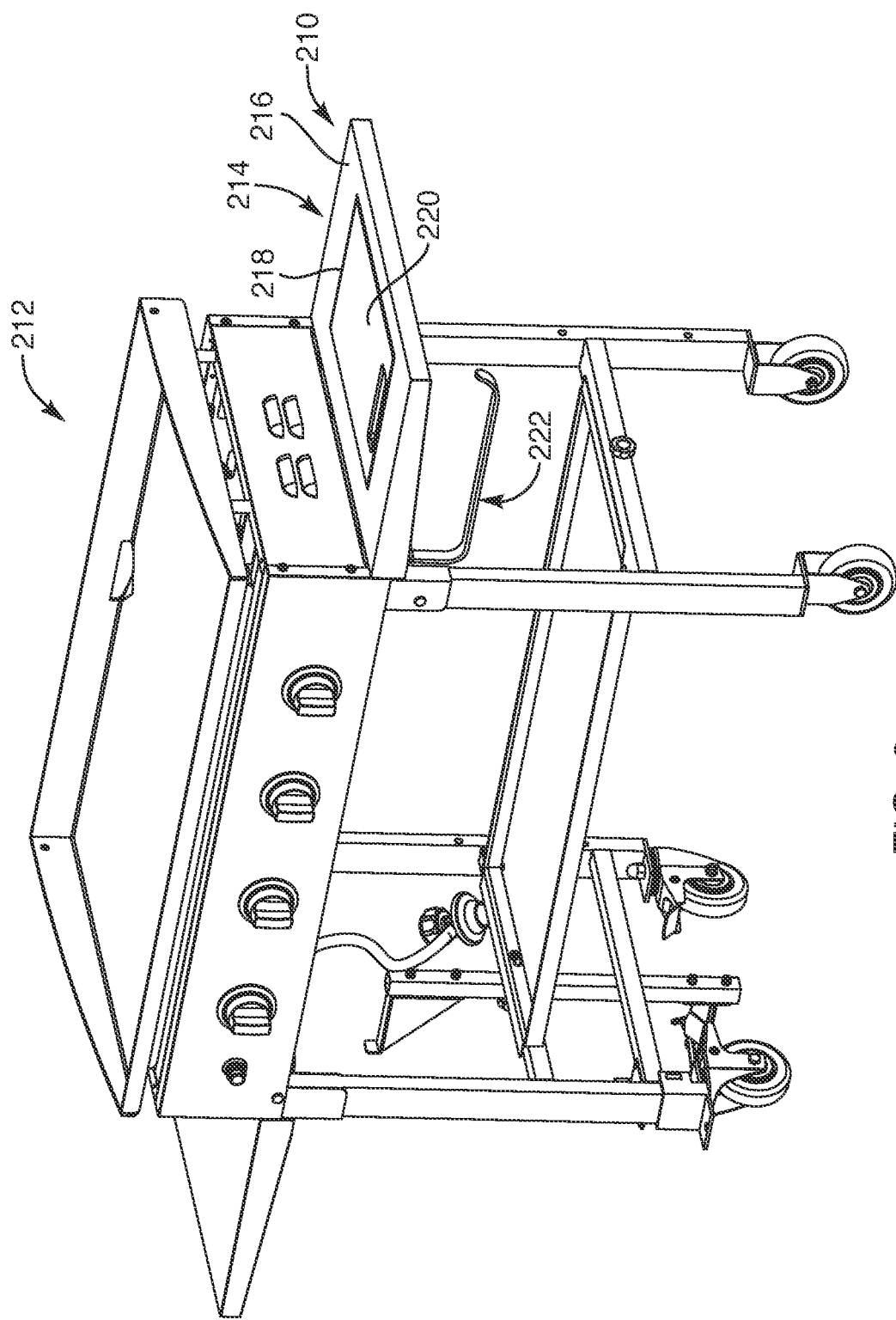
FIG. 6 is a perspective view of another embodiment of a portable outdoor cooking station and a side shelf system, according to the present invention.
Figure 7A:
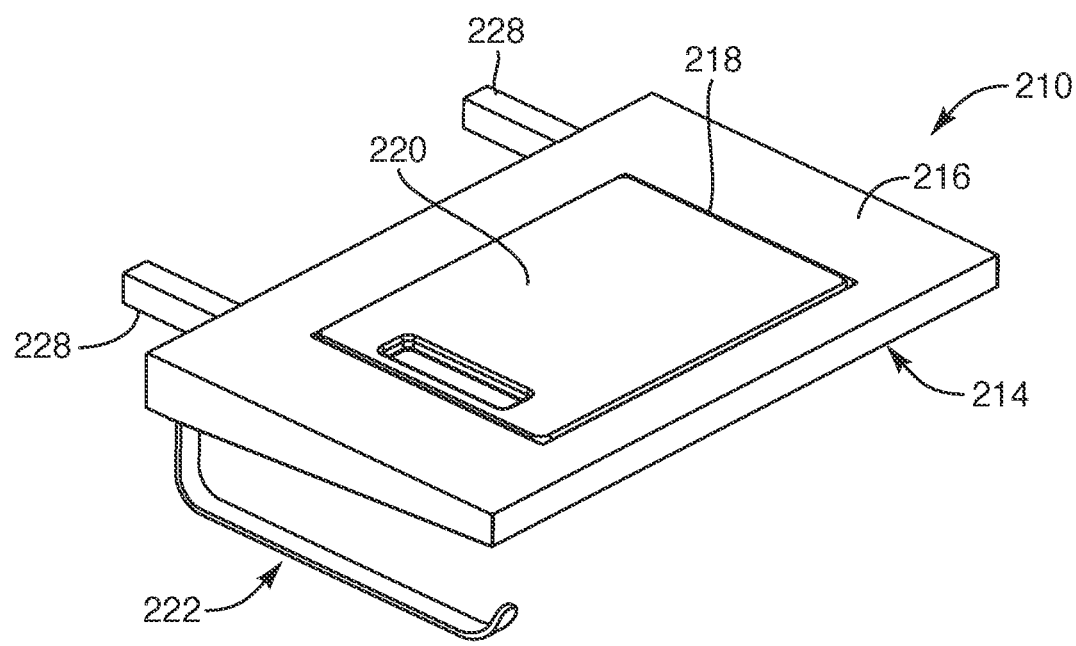
FIG. 7A is a perspective top view of the side shelf system of FIG. 6, according to another embodiment of the present invention.
Figure 7B:
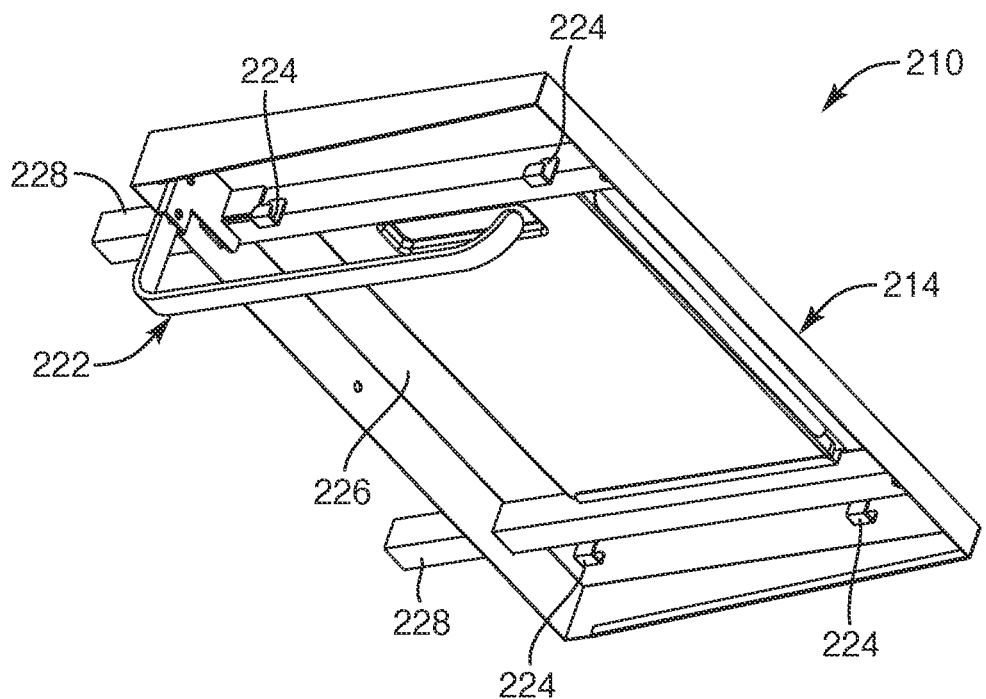
FIG. 7B is a perspective bottom view of the side shelf system of FIG. 6, according to another embodiment of the present invention.

Now with reference to FIGS. 6, 7A, and 7B, another embodiment of side shelf system 210 secured to a cooking station 212 is provided. This embodiment of the side shelf system 210 may include similar structural features as that described and depicted relative to the side shelf system 12 of FIGS. 1 and 3, except in this embodiment the side shelf system 210 of the cooking station 212 may not include a food pan employed therewith. Similar to previous embodiments, the side shelf system 210 of this embodiment may include a side shelf 214 with an upper surface 216, the upper surface 216 defining an opening 218 therein. Such opening 218 may be sized and configured to receive a cutting board 220, the cutting board 220 being readily removable from the opening 218. Further, the side shelf system 210 may include a holder device 222 sized and configured to hold, for example, a paper towel roll, or for hanging cloth towels or for hanging cooking utensils or the like thereon. In another embodiment, the side shelf system may include various hooks 224 positioned and mounted to an underside 226 of the side shelf 214. Such hooks 224 may be sized and configured for hanging a waste bag, for example, such that the waste bag may be positioned directly under the cutting board 220. Further, as in previous embodiments, the side shelf may be removably coupled to frame components of the cooking station 212. For example, sleeve extensions 228 may extend from one side of the side shelf to couple to the frame components of the cooking station 212.

Figure 8:
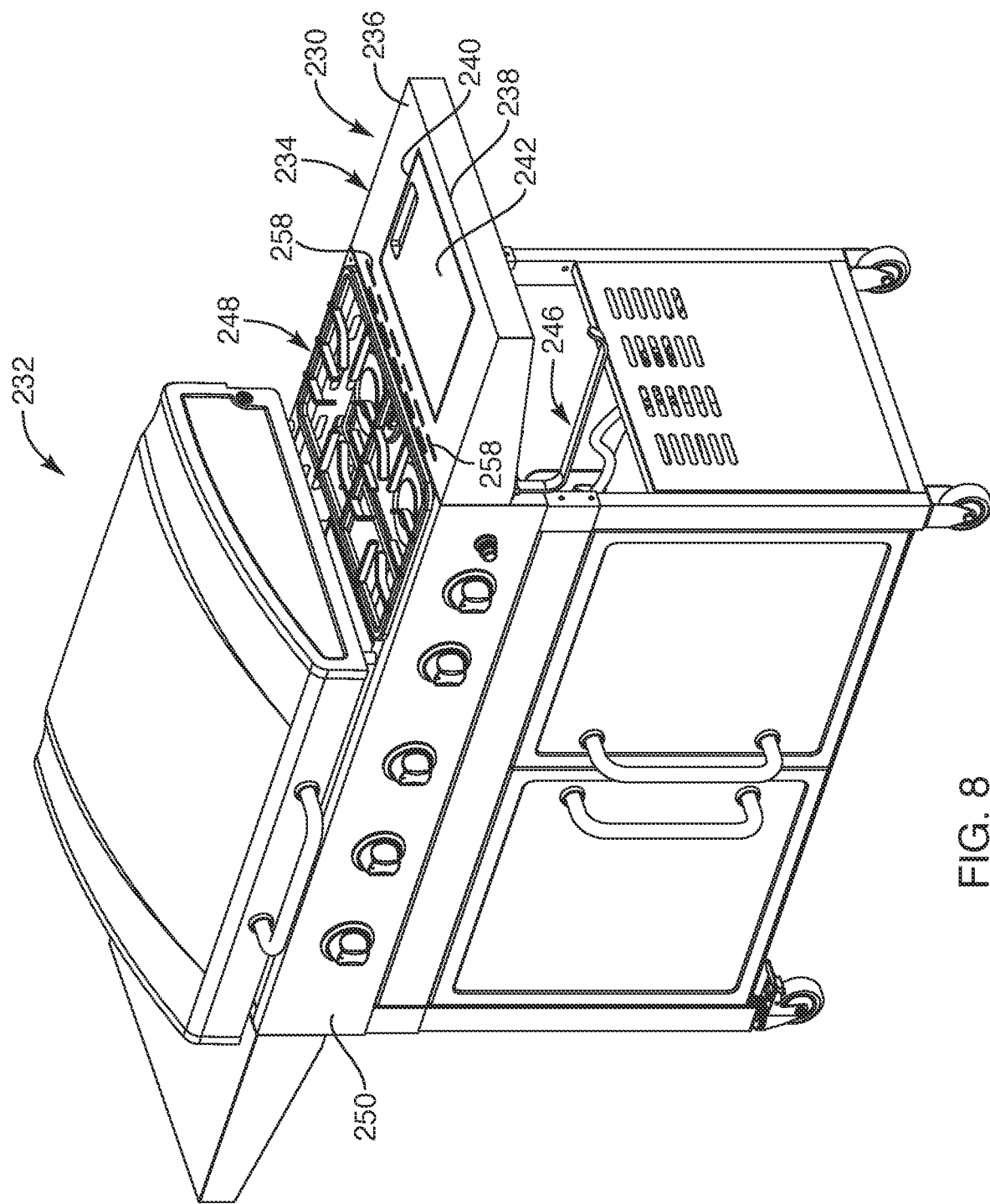
FIG. 8 is a perspective view of another embodiment of a portable outdoor cooking station and a side shelf system, according to the present invention.
Figure 9A:
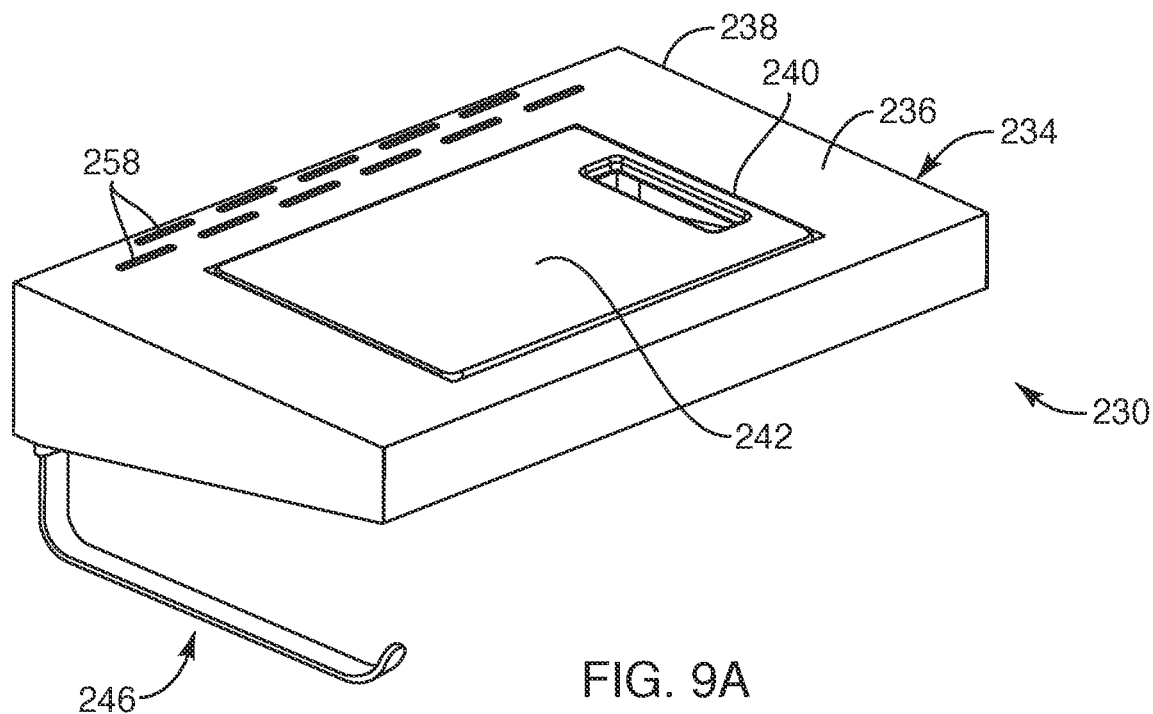
FIG. 9A is a perspective top view of the side shelf system of FIG. 8, according to another embodiment of the present invention.
Figure 9B:
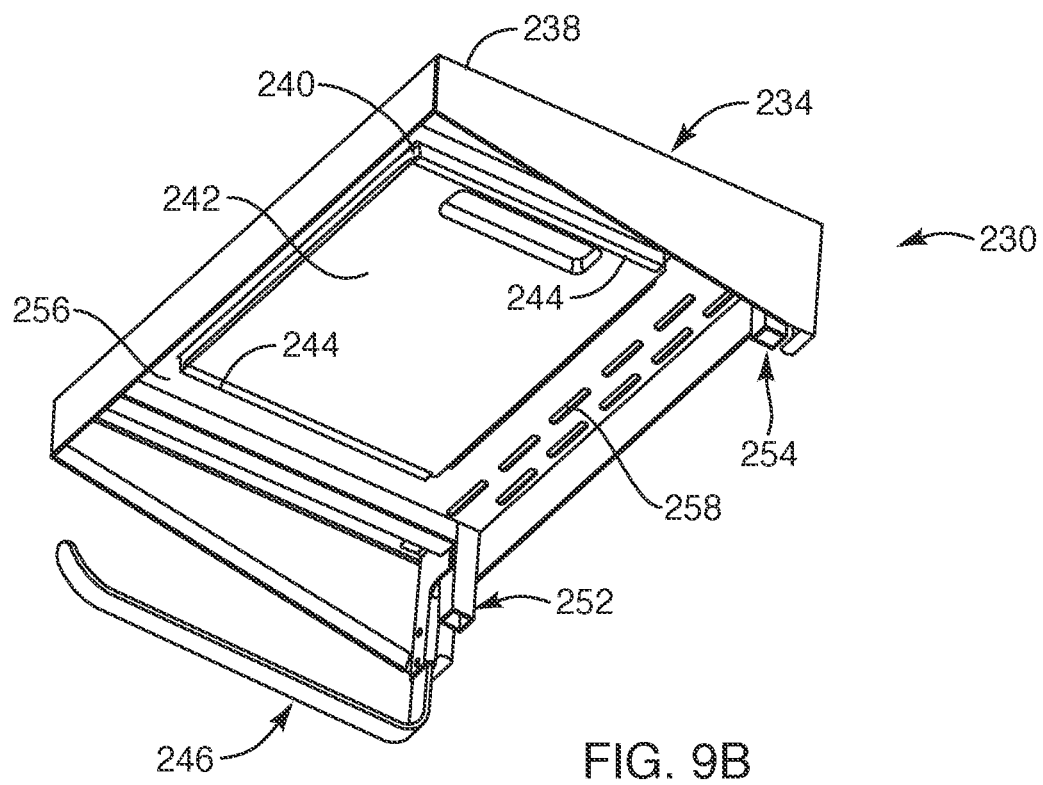
FIG. 9B is a perspective bottom view of the side shelf system of FIG. 8, according to another embodiment of the present invention.

Now with reference to FIGS. 8, 9A, and 9B, another embodiment of a side shelf system 230 sized and configured to be coupled to a portable outdoor cooking station 232 is provided. This embodiment of the side shelf system 230 may include similar structural features of previous embodiments of the side shelf system (see FIGS. 1 and 3). For example, similar to previous embodiments, the side shelf system 230 may include a side shelf 234 with an upper surface 236 extending to define a periphery 238. The upper surface 236 of the side shelf 234 may define an opening 240 therein sized and configured to removably receive a cutting board 242. Such cutting board 242 may sit over ledges 244 extending laterally inward from the opening 240 such that an upper surface of the cutting board 242 may be somewhat flush or level with the upper surface 236 of the side shelf 234. Further, the side shelf system 230 may include a holder device 246 sized and configured to hold a paper towel roll or any other suitable utensil or cleaning device.

In this embodiment, the side shelf system 230 may be coupled to the cooking station 232 such that the upper surface 236 of the side shelf 234 may be positioned somewhat level with burner structure 248 of the cooking station 232 or level with an upper end of a front panel 250 of the cooking station 232. The side shelf system 230 may include a first coupling extension 252 and a second coupling extension 254, each of which may be sized and configured to couple to frame structure of the cooking station 232. For example, the first and second coupling extensions 252, 254 of this embodiment may extend downward from an underside 256 of the side shelf 234 and adjacent one side of the side shelf 234 in a direction perpendicular relative to the upper surface 236 of the side shelf 234. Such first and second coupling extensions 252, 254 may be coupled to corresponding frame structure of the cooking station 232 and may be in the form of sleeve structure, for example. Further, in this embodiment, the upper surface 236 may define venting structure 258 in the form of slots or narrow openings extending along one side of the upper surface 236 adjacent the burner structure 248 of the cooking station 232.

Figure 10:
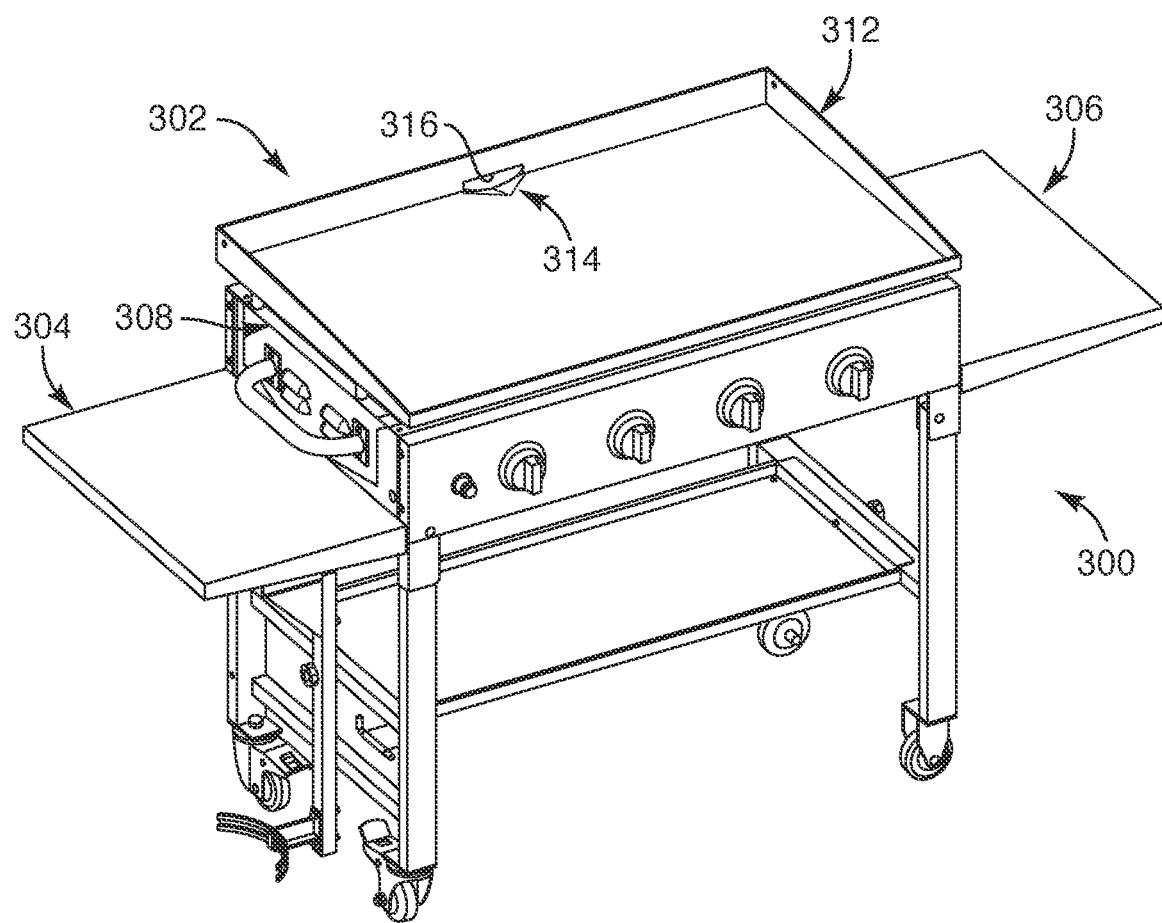
FIG. 10 is a perspective front view of one embodiment of a griddle and outdoor cooking station, depicting a rear trough and opening defined in a rear splash guard of the griddle, according to the present invention.
Figure 11:
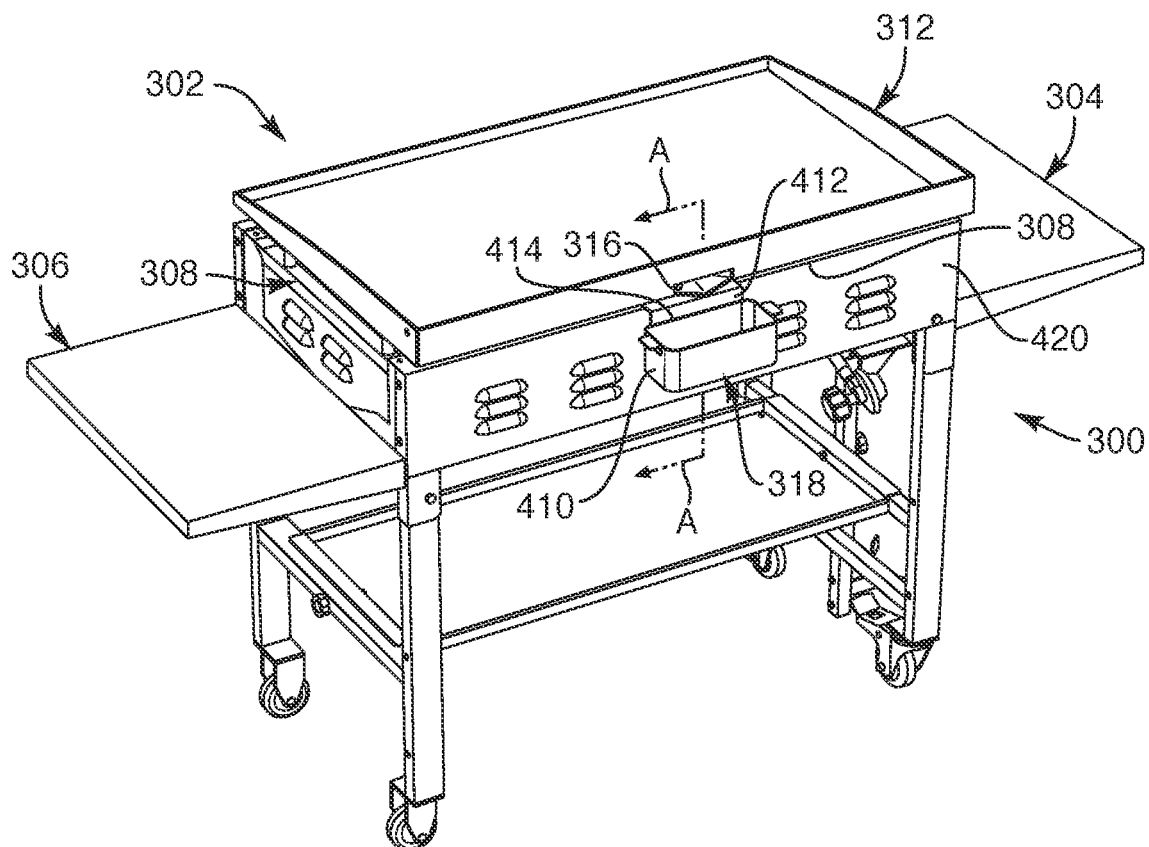
FIG. 11 is a perspective rear view of the griddle and cooking station of FIG. 10, depicting a grease container positioned below the rear trough and opening, according to another embodiment of the present invention.

Now with reference to FIGS. 10 and 11, another embodiment of an outdoor cooking station 300 sized to support a griddle 302 thereon is provided. The cooking station 300 may be portable and include first and second side shelfs 304, 306 with, although not depicted in FIG. 10, the structural features of a cutting board sized to be suspended within an opening defined in one or both of the first and second side shelves and may also include the various accessory components adjacent to the side shelves, as depicted and described in previous embodiments herein (see, e.g., FIG. 1). The griddle 302 depicted in FIGS. 10 and 11 of this embodiment is the griddle depicted in FIG. 6.

The griddle 302 may be sized and configured to be supported by an upper portion 308 of the cooking station 300 with, for example, gas flame burners 310 (FIG. 12) that may be employed with any suitable burnable fuel, such as propane and natural gas. Such griddle 302 may be employed with various components to manage grease and to keep the user substantially clean of such grease. In various embodiments of the present invention, components employed to manage grease while cooking on the griddle 302 may include a splash guard 312, a trough 314 cooperating with a through hole 316 (or otherwise referenced as a rear opening) defined in a rear portion of the griddle 302, and a grease container 318, each of which will be described in further detail herein.

With reference to FIGS. 13-16, the griddle may include an upper side 320 and an underside 322 or bottom with a periphery 324 extending along and defining a rear side 326, a front side 328, a left side 330 and a right side 332. The upper side 320 of the griddle 302 may include a flat cooking surface 334 that may be elongated and generally rectangular shaped to define a longitudinal axis 336 so as to define a griddle length 338 and a griddle width 340, the griddle width 340 extending laterally relative to the longitudinal axis 336. The cooking surface 334 with the rectangular shape may also include a square shaped cooking surface. The flat cooking surface 334 may also define a length and width that substantially corresponds with the respective griddle length 338 and the griddle width 340, but for the depth of the plate material extending along the periphery 324 of the griddle 302 to form the splash guard 312. The flat cooking surface 334 may extend between a rear end 342 and a front end 344 and between a left end 346 and a right end 348 to define the flat cooking surface 334.

The splash guard 312 of the griddle 302 may extend upward from the upper side 320 of the griddle 302 and along at least a portion of the periphery 324 of the griddle 302. In one embodiment, the splash guard 312 may extend continuously along the periphery 324 of the griddle 302. For example, the griddle 302 may include a rear splash guard 350, a front splash guard 352, a left splash guard 354, and a right splash guard 356 each extending along the corresponding rear side 326, front side 328, left side 330 and right side 332, respectively, of the periphery 324 of the griddle 302. The splash guard 312 may be sized and configured to block hot spattering grease from out-side the periphery 324 of the griddle 302 as well as act as a barrier to prevent grease from spattering or spilling over the griddle 302 and to the burners 310 (FIG. 12) below the griddle 302.

The front splash guard 352 may be elongated to extend along an entire length of the front end 344 of the cooking surface 334. Further, the front splash guard 352 may extend upward directly from the cooking surface 334 to define a front guard height 358. The rear splash guard 350 may be elongated to extend along an entire length of the rear end 342 or rear side 326 of the cooking surface 334 to define a rear guard height 360. Along a majority of the length of the rear splash guard 350, the rear splash guard 350 may extend directly from the cooking surface 334 along the rear end 342 to define the rear guard height 360. The rear guard height 360 may be higher or greater than the front guard height 358.

The left and right splash guards 354, 356 may include similar profiles extending between first and second ends 362, 364 thereof, the first end 362 of each of the left and right splash guards 354, 356 coupled to opposite ends of the rear splash guard 350 and the second end 364 of each of the left and right splash guards 354, 356 coupled to opposite ends of the front splash guard 352. The left and right splash guards 354, 356 may extend directly from the cooking surface 334 along an entire length of the respective left and right ends 346, 348 of the cooking surface 334. The first end 362 of each of the left and right splash guards 354, 356 may be higher or greater in height than the second end 364 of each of the left and right splash guards 354, 356 such that the left and right splash guards 354, 356 may taper or slope in height toward the second end 364. With this arrangement, the second end 364 of the left and right splash guards 354, 356 may be similar in height to the front splash guard 352 and the first end 362 may be similar in height to the rear splash guard 350 such that the upper periphery or top edge 366 of each of the splash guard provides a substantially continuous transition (without abrupt changes in height) between the ends of each of the splash guards and along the top edge 366 of the splash guards. As set forth, the front splash guard 352 may be smaller in height than the rear splash guard 350 so that the user can effectively cook along the front side 328 of the griddle 302 without being impeded by the front splash guard 352 while also substantially protecting the user from spattering grease.

Figure 10A:
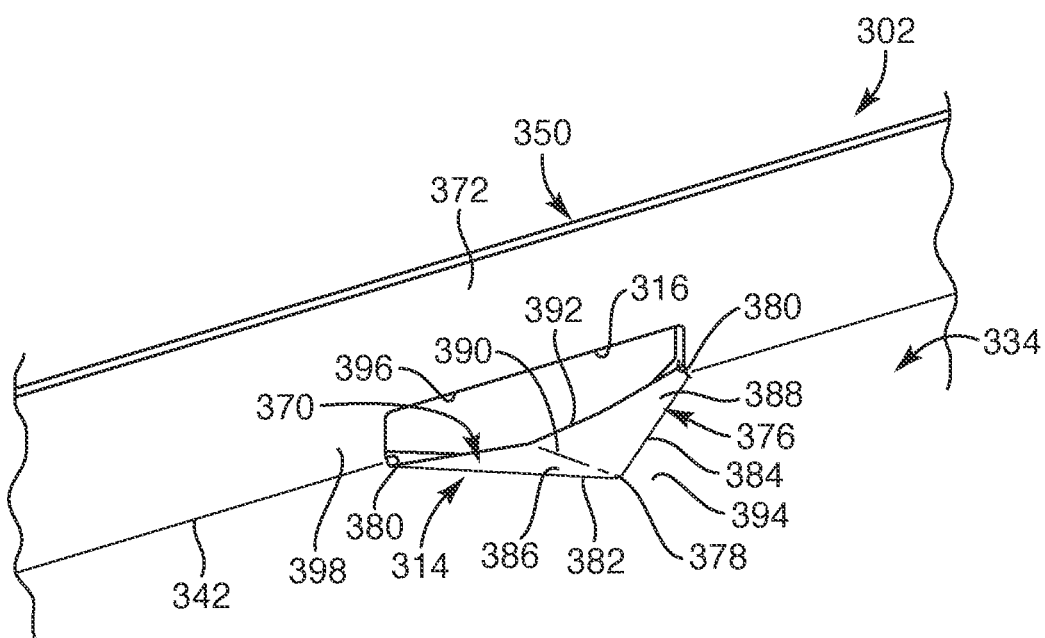
FIG. 10A is an enlarged perspective view of the rear trough and opening of the griddle of FIG. 10, according to another embodiment of the present invention.
Figure 11A:
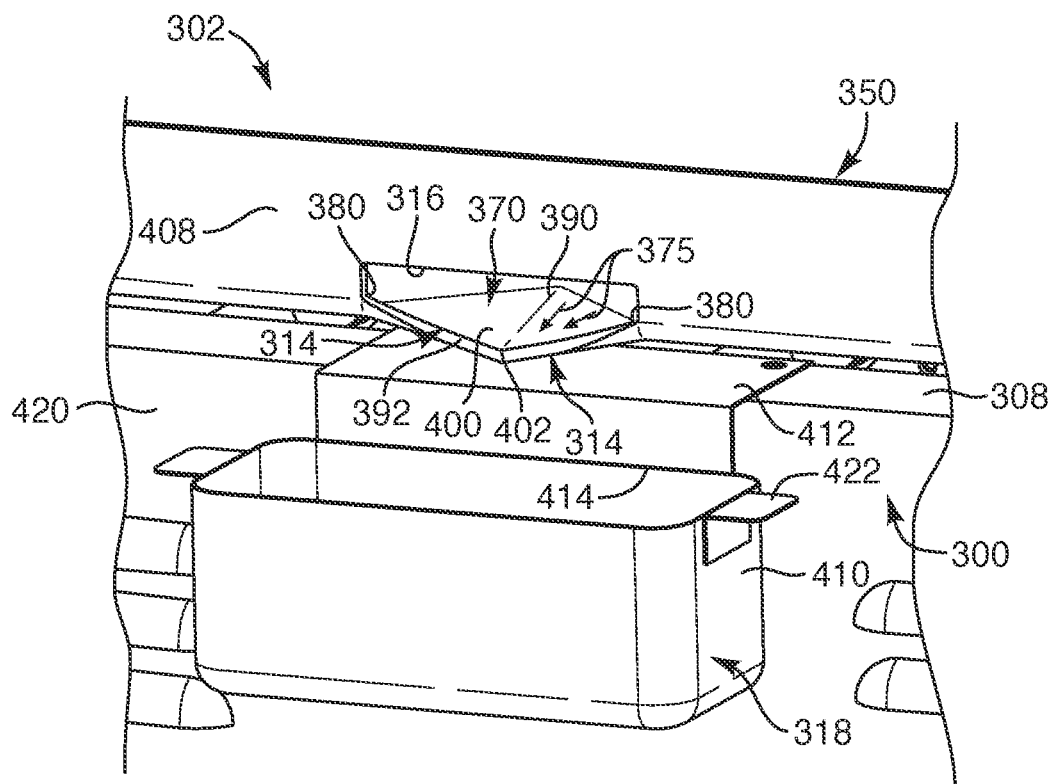
FIG. 11A is an enlarged perspective rear view of the grease container and the rear trough of the griddle of FIG. 11, according to another embodiment of the present invention.

With respect to FIGS. 10A and 11A, as previously set forth, the griddle 302 may include the trough 314 sized and configured to receive grease or other food byproduct. The trough 314 may extend directly from the cooking surface 334 and may be positioned adjacent the rear end 342 of the cooking surface 334. Further, in one embodiment, the trough 314 may be integrally formed with the cooking surface 334 of the griddle 302. In another embodiment, the trough 314 may be a monolithic structure relative to the plate material with the cooking surface 334 of the griddle 302. In one embodiment, the trough 314 may define a sloped surface 370, sloping downward toward and to the through hole 316. In another embodiment, the trough 314 may be sloped so as to funnel the grease rearward to the through hole 316. In another embodiment, the trough 314 may be positioned along a mid-portion 372 of the rear splash guard 350 and adjacent the rear end 342 of the cooking surface 334. In this manner, the trough 314 may be sized and configured to receive heated grease from the cooking surface 334 and sloped downward and rearward to funnel grease to the through hole 316 at the rear side 326 of the griddle 302.

Further, the trough 314 may funnel grease to the through hole 316 in a lateral rearward direction, as indicated by arrows 375, relative to the longitudinal axis 336 of the griddle 302. The trough 314 may be sloped to define a downward angle 374 (FIG. 12) relative to the cooking surface 334 and directly depending from the cooking surface 334. Along a top edge 376 of the sloped surface 370 of the trough 314, the sloped surface 370 may extend generally from a point 378 or region in the cooking surface 334 and extend to opposite lower ends 380 defining the rear opening 316 such that the top edge 376 of the trough 314 defines and exhibits a v-shape. The top edge 376 of the sloped surface 370 may extend from the point 378 (or intersection region of the v-shape) to the opposite lower ends 380 of the rear opening 316 to define a first top edge 382 and a second top edge 384. The sloped surface 370 may extend with a first sloped surface 386 and a second sloped surface 388, the first and second sloped surfaces 386, 388 extending downward from the first and second top edges 382, 384, respectively, to extend to a bottom portion 390 or valley of the trough 314. The bottom portion 390 of the trough 314 may also be sloped downward to the rear opening 316. The bottom portion 390 or valley of the trough 314 may generally be aligned with and extend to a central portion along a bottom edge 392 of the rear opening 316.

In one embodiment, the griddle 302 includes a single trough 314 extending only along the rear end 342 or rear portion of the cooking surface 334 such that there are no other troughs extending along the length of the front end 344, the left end 346 and the right end 348 of the cooking surface 334. In another embodiment, the trough 314 extends adjacent and along a central rear portion 394 adjacent the rear end 342 of the cooking surface 334. With this arrangement, the trough 314 extending along the rear end 342 or central rear portion 394 of the cooking surface 334 allows for the user to push away the grease or unwanted food byproduct toward the central rear portion 394 of the cooking surface 334, and not forward or to the sides so that front and side portions of the cooking surface 334 and cooking station 300 (FIG. 10) may be more likely to be properly maintained and clean from unwanted grease.

Further, in one embodiment, the previously set forth through hole 316 or rear opening may be defined in the rear splash guard 350. Such through hole 316 defined in the rear splash guard 350 may be sized and configured for receiving and feeding the grease or food byproduct from the trough 314 and through the through hole 316 and off the cooking surface 334. In one embodiment, the through hole 316 may be an elongated notch and may extend through a lower portion 398 of the rear splash guard 350 such that an upper portion of the rear splash guard may define an upper edge 396 of the through hole 316. The elongated notch may be formed in a bottom edge of the rear splash guard 350. In another embodiment, the through hole 316 may be centered along the elongated length of the rear splash guard 350 so as to be substantially centered and aligned with a bottom portion 390 of the trough 314. In this manner, the through hole 316 defined in the rear splash guard 350 may be positioned along the rear splash guard 350 at the mid-portion 372, relative to a length, of the rear splash guard 350 and act in conjunction or cooperation with the trough 314 for funneling grease along the trough 314 and away from the griddle 302.

Figure 12:
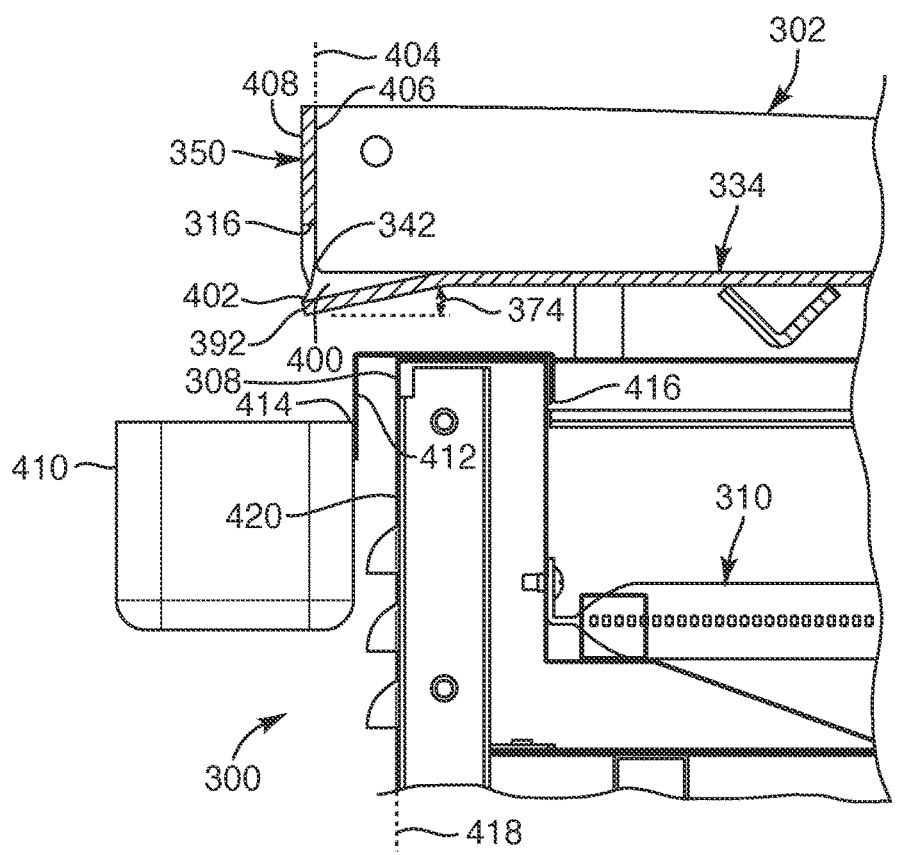
FIG. 12 is a partial cross-sectional view of the griddle and outdoor cooking station taken along section line A-A of FIG. 11, according to another embodiment of the present invention.
Figure 13:
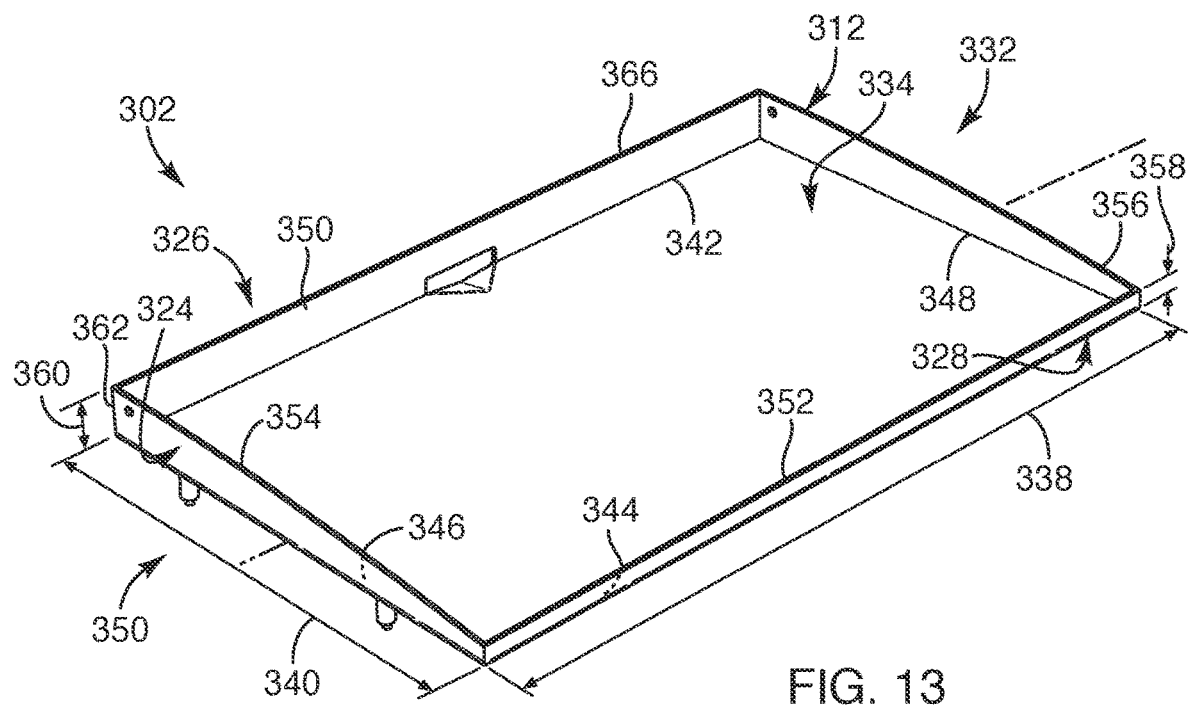
FIG. 13 is a perspective front view of the griddle, according to another embodiment of the present invention.

Now with reference to FIGS. 11A and 12, in another embodiment, the bottom edge 392 of the rear opening 316 may be defined by a rear end portion 400 or rear end 402 of the trough 314. The rear end 402 or rear end portion 400 or bottom edge 392 of the trough 314 may extend and be generally aligned with a plane 404 defined by an interior surface 406 of the rear splash guard 350. In another embodiment, the rear end 402 may extend beyond the plane 404 defined by the interior surface 406 of the rear splash guard 350. In another embodiment, the rear end 402 of the trough 314 may extend and be aligned with a plane defined by any one of the interior surface or an exterior surface 408 of the rear splash guard 350. In another embodiment, the rear end 402 of the trough 314 may extend beyond or further rearward than the plane 404 of the interior surface 406 of the rear splash guard 350. With this arrangement, the rear end portion 400 of the trough 314 may extend and be sloped downward to and through the rear opening 316 in a manner to facilitate grease and food byproduct to be appropriately removed from the cooking surface 334 and griddle 302. Further, by positioning the trough 314 and rear opening 316 at the rear side 326 of the griddle 302, the unsightly grease and food byproduct may be moved out of view of the user.

Now with reference to FIGS. 11, 11A and 12, an embodiment of the before-mentioned grease container 318 will now be described in association with the griddle 302 and the cooking station 300. The grease container 318 may include a container portion 410 and a latch portion 412, the latch portion 412 extending upward from one side and an upper edge 414 of the container portion 410. The container portion 410 may exhibit an open top and may be sized and positioned to readily catch drippings from the trough 314 of the griddle 302. The latch portion 412 may include a free end 416 and may extend generally with a c-shaped cross-section between the free end 416 and the container portion 410. The latch portion 412 may be sized and configured to couple directly to the upper portion 308 of the cooking station 300. The griddle 302 may extend more rearward than rear plane 418 defined by a rear surface 420 or rear frame structure of the cooking station 300 such that the rear end 402 of the trough 314 may also extend more rearward than the rear plane 418 defined by the rear surface 420 or rear frame structure of the cooking station 300. As such, the latch portion 412 of the grease container 318 may be sized so that, upon positioning the latch portion 412 over the upper portion 308 of the cooking station 300, the container portion 410 may be positioned directly below the rear end 402 of the trough 314. In this manner, grease or food byproduct may be funneled down the sloped surface 370 of the trough 314 so that the grease and food byproduct may funnel directly into the container portion 410 of the grease container 318. In another embodiment, a latch portion of a grease container may couple directly to the top edge 366 of the rear splash guard 350.

Figure 14:
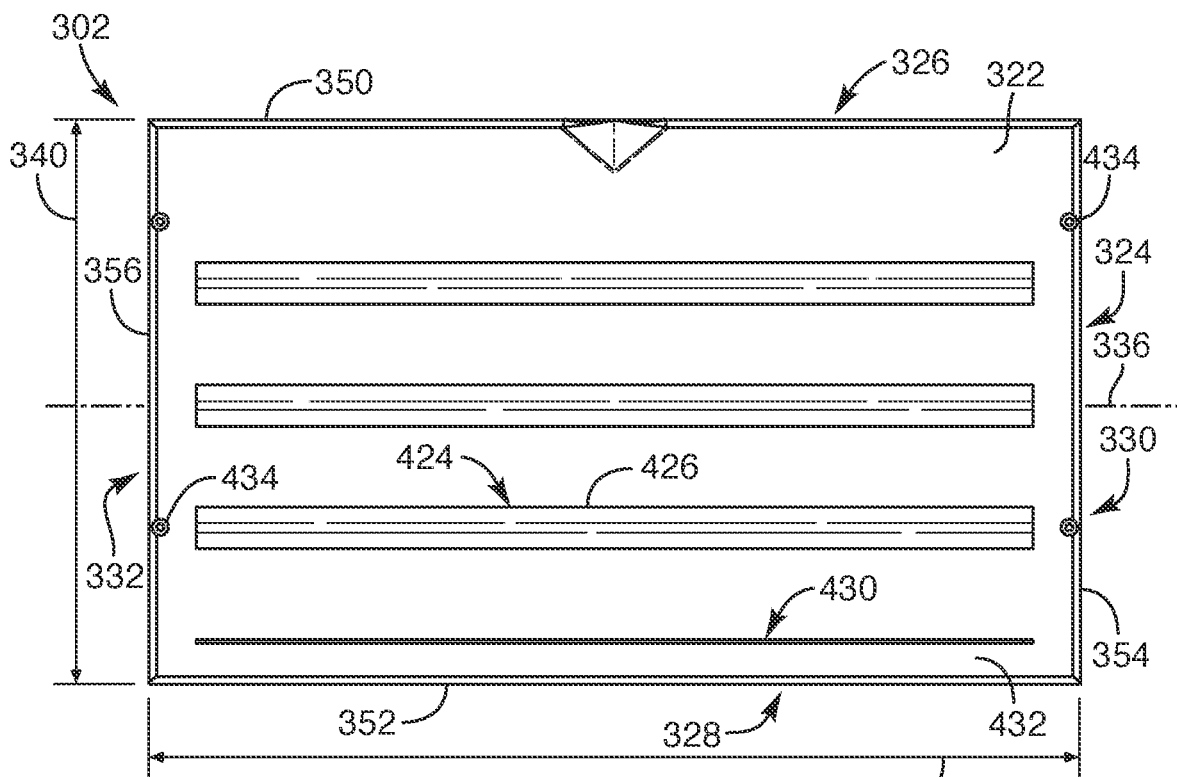
FIG. 14 is a bottom view of the griddle, according to another embodiment of the present invention.
Figure 15:
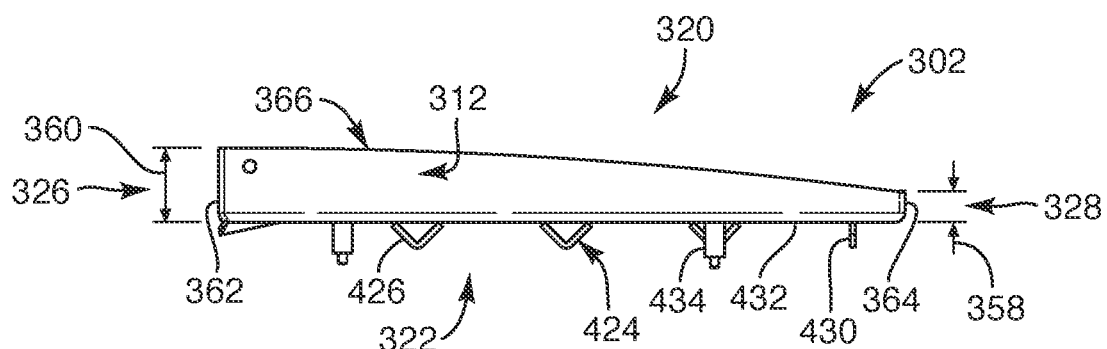
FIG. 15 is a side view of the griddle, according to another embodiment of the present invention.

With reference to FIGS. 14 and 15, respective bottom and side views of the griddle 302 are depicted. The underside 322 of the griddle 302 may include one or more stabilizers 424. For example, the one or more stabilizers 424 may be elongated structures 426 with a v-shaped cross-section. The one or more stabilizers 424 may be positioned and spaced so that the elongated structures 426 extend along a length 338 of the griddle 302 or parallel relative to the longitudinally axis 336 of the griddle 302. Such one or more stabilizers 424 may be directly welded directly to the underside 322 of the griddle 302. With this arrangement, the one or more stabilizers 424 may be positioned along the underside 322 to stabilize the griddle 302 and substantially prevent potential warping of the griddle 302 due to over-heating.

Figure 16:
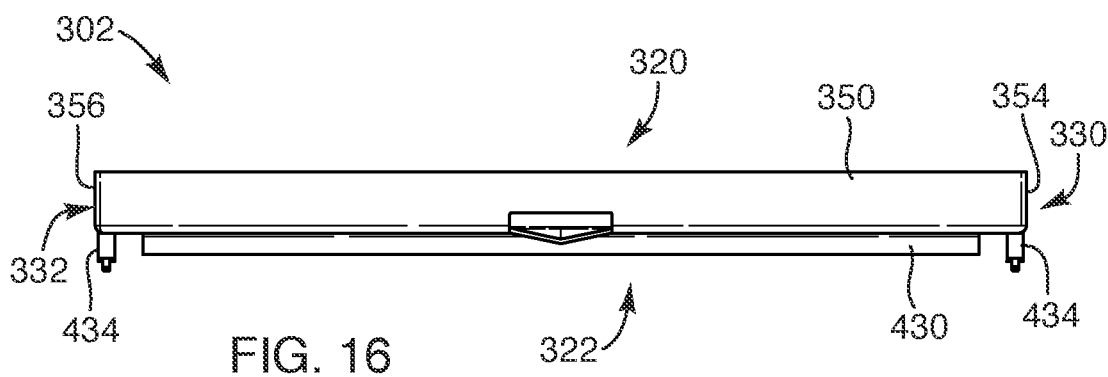
FIG. 16 is a rear view of the griddle, according to another embodiment of the present invention.

Further, as depicted in FIGS. 14-16, the underside 322 of the griddle 302 may include a heat guard 430 that may extend along a front portion 432 of the underside 322 of the griddle 302. The heat guard 430 may be positioned and extend longitudinally parallel with the axis 336 so as to channel heat from bellowing out the front side 328 of the griddle 302 where the user of the griddle 302 typically is positioned. Further, the underside 322 of the griddle 302 may include legs 434, such as four legs, positioned along the left and right sides 330, 332 of the griddle 302. Such legs 434 may be positioned within corresponding apertures defined in the upper portion 308 of the cooking station 300 along the left and right sides 330, 332 of the cooking station 300 (see FIGS. 10 and 11).

The griddle 302 may be manufactured from metallic materials, such as, carbon steel, cast iron, stainless steel, or aluminum, or various metal alloys, or composite layering of materials, or any other suitable cooking surface material known in the art, such as porcelain coated materials. In one embodiment, the metallic materials may be manufactured using cold rolled steel processes, or hot rolled steel techniques, or any other known manufacturing process, such as casting or stamping, as known in the art. The various plate components of the griddle 302 may include a thickness of 5-6 millimeters, but is not so limited, as such thickness of the various components of the griddle 302 may range, for example, between 4-10 millimeters. Also, portions of the griddle, such as the trough 314, rear opening 316, and splash guards 312 may be formed by employing cutting and bending techniques from sheet or plate material to form the griddle 302 as well as forming portions to the griddle with welding techniques, or employing any other known process or techniques to form the griddle 302, as known by one of ordinary skill in the art.

Further, the various structural components of the various embodiments of the cooking station and the side shelf system and any other structural components set forth herein may be formed of various metallic materials, such as steel, stainless steel, copper, aluminum or any other suitable material with high temperature ratings, such as various suitable polymeric materials, and be formed from known structural components, such as sheet metal at various gauges/thicknesses or other known metallic structures, such as tubing or the like, and may be formed and manufactured through various known processes in the art, such as casting, welding, rolling, bending, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station configured to manage unwanted food byproduct, comprising:
    a frame including a front side, a rear side, a left side and a right side each extending between a lower end and an upper portion, the frame including multiple heating elements coupled thereto;
    a griddle configured to be supported by the upper portion of the frame and positioned above the heating elements, the griddle including:
        a flat cooking surface extending between a left end and a right end of the flat cooking surface and extending between a front end and a rear end of the flat cooking surface, the griddle configured to be positioned on the frame so that the front end and the rear end of the flat cooking surface is oriented along and corresponds with the front side and the rear side of the frame, respectively;
        a splash guard extending directly upward from the flat cooking surface along each length of the left and right ends and the front and rear ends of the cooking surface, the splash guard extending along the rear end of the cooking surface at least partially defining a grease opening therein, the grease opening positioned adjacent the rear end of the cooking surface, the splash guard along the rear end of the cooking surface extending a height from the cooking surface that is greater than the height of the splash guard along the front end of the cooking surface; and
        a sloped surface extending from the flat cooking surface and extending adjacent the rear end of the flat cooking surface so as to extend downward relative to the flat cooking surface, the sloped surface positioned adjacent the grease opening defined at least partially in the splash guard.

2. The outdoor cooking station of claim 1, further comprising a grease container having a container portion, the container portion configured to be positioned directly below the sloped surface of the griddle and adjacent the rear side of the frame so that the food byproduct is configured to move along the sloped surface and into the container portion of the grease container.

3. The outdoor cooking station of claim 1, wherein the grease opening is defined along a rear central portion of the splash guard adjacent the rear end of the cooking surface.

4. The outdoor cooking station of claim 1, wherein the grease opening is defined adjacent a central portion of the rear end of the cooking surface.

5. The outdoor cooking station of claim 1, wherein the sloped surface extends downward and rearward of the splash guard positioned along the rear end of the cooking surface.

6. The outdoor cooking station of claim 1, wherein the grease opening defined in the griddle is the only through hole type opening of the griddle that is sized and configured to facilitate the food byproduct to move therethrough.

7. A griddle configured to manage unwanted food byproduct, comprising:
    a flat cooking surface extending to define a rear end, a front end, a left end and a right end, the rear end extending parallel relative to the front end and the left end extending parallel relative to the right end;
    a splash guard extending directly upward from the flat cooking surface along each length of the left and right ends and the front and rear ends of the cooking surface, the splash guard extending along the rear end of the cooking surface at least partially defining a grease opening therein, the grease opening positioned adjacent the rear end of the cooking surface, the splash guard along the rear end of the cooking surface extending a height from the cooking surface that is greater than the height of the splash guard along the front end of the cooking surface; and
    a sloped surface extending from the flat cooking surface and extending adjacent the rear end of the flat cooking surface so as to extend downward relative to the flat cooking surface, the sloped surface positioned adjacent the grease opening defined at least partially in the splash guard.

8. The griddle of claim 7, wherein the grease opening is defined along a rear central portion of the splash guard adjacent the rear end of the cooking surface.

9. The griddle of claim 7, wherein the grease opening is defined adjacent a central portion of the rear end of the cooking surface.

10. The griddle of claim 7, wherein the sloped surface extends downward and rearward of the splash guard positioned along the rear end of the cooking surface.

11. The griddle of claim 7, wherein the grease opening defined in the griddle is the only through hole type opening of the griddle that is sized and configured to facilitate the food byproduct to move therethrough.

12. The griddle of claim 7, wherein the sloped surface extends with a first sloped surface and a second sloped surface, the first and second sloped surfaces each extending toward the grease opening defined in the griddle and positioned adjacent the rear end of the flat cooking surface.

13. A griddle configured to manage unwanted food byproduct, comprising:
- a flat cooking surface extending to define a rear end, a front end, a left end and a right end, the rear end extending parallel relative to the front end and the left end extending parallel relative to the right end;
- a splash guard extending upward from the flat cooking surface along each length of the left and right ends and the front and rear ends of the cooking surface, the splash guard extending upward to define a splash guard top edge such that the splash guard top edge extends above each of the left and right ends and the front and rear ends of the flat cooking surface;
- a sloped surface extending from the flat cooking surface and extending adjacent the rear end of the flat cooking surface so as to extend downward relative to the flat cooking surface; and
- a grease opening defined in the griddle and positioned adjacent the rear end of the flat cooking surface and positioned adjacent the sloped surface such that the sloped surface is configured to drain the food byproduct from the flat cooking surface and through the grease opening and away from the griddle;
- wherein the splash guard top edge extends adjacently above the grease opening defined in the griddle.

14. The griddle of claim 13, wherein the rear opening is defined along a rear central portion of the splash guard adjacent the rear end of the cooking surface.

15. The griddle of claim 13, wherein the grease opening is defined adjacent a central portion of the rear end of the cooking surface.

16. The griddle of claim 13, wherein the sloped surface extends downward and rearward of the splash guard positioned along the rear end of the cooking surface.

17. The griddle of claim 13, wherein the grease opening defined in the griddle is the only through hole type opening of the griddle that is sized and configured to facilitate byproduct moving therethrough.

18. The griddle of claim 13, wherein the sloped surface extends with a first sloped surface and a second sloped surface, the first and second sloped surfaces each extending toward the grease opening defined in the griddle and positioned adjacent the rear end of the flat cooking surface.

19. An outdoor cooking station configured to manage unwanted food byproduct, comprising:
- a frame including a front side, a rear side, a left side and a right side each extending between a lower end and an upper portion, the frame including multiple heating elements coupled thereto;
- a griddle configured to be supported by the upper portion of the frame and positioned above the heating elements, the griddle including:
  - a flat cooking surface extending to define a rear end, a front end, a left end and a right end, the rear end extending parallel relative to the front end and the left end extending parallel relative to the right end;
  - a splash guard extending upward from the flat cooking surface along each length of the left and right ends and the front and rear ends of the cooking surface, the splash guard extending upward to define a splash guard top edge such that the splash guard top edge extends above each of the left and right ends and the front and rear ends of the flat cooking surface;
  - a sloped surface extending from the flat cooking surface and extending adjacent the rear end of the flat cooking surface so as to extend downward relative to the flat cooking surface; and
  - a grease opening defined in the griddle and positioned adjacent the rear end of the flat cooking surface and positioned adjacent the sloped surface such that the sloped surface is configured to drain the food byproduct from the flat cooking surface and through the grease opening and away from the griddle;
  - wherein the splash guard top edge extends adjacently above the grease opening defined in the griddle.

20. The outdoor cooking station of claim 19, further comprising a grease container having a container portion, the container portion configured to be positioned directly below the sloped surface of the griddle and adjacent the rear side of the frame so that the food byproduct is configured to move along the sloped surface and into the container portion of the grease container.

21. The outdoor cooking station of claim 19, wherein the grease opening is defined along a rear central portion of the splash guard adjacent the rear end of the cooking surface.

22. The outdoor cooking station of claim 19, wherein the grease opening is defined adjacent a central portion of the rear end of the cooking surface.

23. The outdoor cooking station of claim 19, wherein the sloped surface extends downward and rearward of the splash guard positioned along the rear end of the cooking surface.

24. The outdoor cooking station of claim 19, wherein the grease opening defined in the griddle is the only through hole type opening of the griddle that is sized and configured to facilitate the food byproduct to move therethrough.

* * * * *